United States Patent
Muramatsu et al.

(10) Patent No.: US 9,077,903 B2
(45) Date of Patent: Jul. 7, 2015

(54) IMAGING DEVICE INCLUDING A BLUR CORRECTING MECHANISM FOR REDUCING THE RADIAL LOAD ON MOVABLE CONNECTORS

(75) Inventors: Koichi Muramatsu, Yokohama (JP); Takashi Ando, Kawasaki (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/122,105

(22) PCT Filed: May 23, 2012

(86) PCT No.: PCT/JP2012/063830
§ 371 (c)(1),
(2), (4) Date: Nov. 25, 2013

(87) PCT Pub. No.: WO2012/161343
PCT Pub. Date: Nov. 29, 2012

(65) Prior Publication Data
US 2014/0104482 A1 Apr. 17, 2014

(30) Foreign Application Priority Data
May 24, 2011 (JP) ................................. 2011-115471

(51) Int. Cl.
*H04N 5/232* (2006.01)
*H04N 5/225* (2006.01)

(52) U.S. Cl.
CPC ......... *H04N 5/23287* (2013.01); *H04N 5/2253* (2013.01); *H04N 5/23258* (2013.01); *G03B 2205/0038* (2013.01)

(58) Field of Classification Search
USPC ...................................... 348/208.7
See application file for complete search history.

(56) References Cited

U.S. PATENT DOCUMENTS 5,845,157 A 12/1998 Imura et al.
8,019,210 B2 * 9/2011 Uno et al. ........................ 396/55
(Continued)

FOREIGN PATENT DOCUMENTS

EP 1833242 A2 9/2007
EP 2 214 054 A2 8/2010
(Continued)

OTHER PUBLICATIONS

International Search Report issued on Sep. 4, 2012 in PCT/JP2012/063830 filed on May 23, 2012.
(Continued)

*Primary Examiner* — Albert Cutler
(74) *Attorney, Agent, or Firm* — Oblon, McClelland, Maier & Neustadt, L.L.P.

(57) ABSTRACT

An imaging device includes an optical system including optical elements, an image sensor, a lens barrel movable relative to a device body to move the optical elements along an optical axis, a fixed element, a movable element on which the image sensor is mounted, a drive mechanism to generate a drive force by flowing an electric current into a magnetic field, to move the movable element relative to the fixed element, and movable connectors each including a bar element and a bearing provided in the fixed element and the movable element provided to movably support the bar element along the axis. The bar elements of the movable connectors are set to move in different directions along the plane orthogonal to the optical axis. At least one of the bearings is disposed outside the lens barrel in the orthogonal direction relative to the optical axis.

12 Claims, 18 Drawing Sheets

(56) References Cited

U.S. PATENT DOCUMENTS

| | | |
|---|---|---|
| 2005/0265704 A1 | 12/2005 | Uenaka et al. |
| 2006/0146400 A1 | 7/2006 | Seo |
| 2007/0154195 A1 | 7/2007 | Irisawa et al. |
| 2009/0189987 A1 | 7/2009 | Muramatsu et al. |
| 2010/0013939 A1 | 1/2010 | Ohno et al. |
| 2011/0001835 A1* | 1/2011 | Awazu .................. 348/208.7 |
| 2011/0129206 A1 | 6/2011 | Muramatsu |
| 2011/0181743 A1 | 7/2011 | Ando |
| 2012/0038784 A1 | 2/2012 | Irisawa et al. |

FOREIGN PATENT DOCUMENTS

| | | |
|---|---|---|
| JP | 7-028114 | 1/1995 |
| JP | 2006-191249 | 7/2006 |
| JP | 2007-114486 | 5/2007 |
| JP | 2007-274666 | 10/2007 |
| JP | 2008-077047 | 4/2008 |
| JP | 2008-090201 | 4/2008 |
| JP | 2008-187699 | 8/2008 |
| JP | 2009-005323 | 1/2009 |
| JP | 2009-204629 | 9/2009 |
| JP | 2010-112978 A | 5/2010 |
| JP | 2010-175751 | 8/2010 |
| JP | 2010-231168 | 10/2010 |
| JP | 2011-112948 | 6/2011 |
| JP | 2011-239020 | 11/2011 |
| JP | 2012-022204 | 2/2012 |
| JP | 2013-021417 | 1/2013 |
| JP | 2013-050500 | 3/2013 |
| WO | WO 2013/031454 A1 | 3/2013 |

OTHER PUBLICATIONS

Extended European Search Report issued Sep. 30, 2014 in Patent Application No. 12790171.8.

Japanese Office Action issued Apr. 28, 2015 in Japanese Application No. 2011-115471 (2 pages).

* cited by examiner

FIG. 16A
FIG. 16B
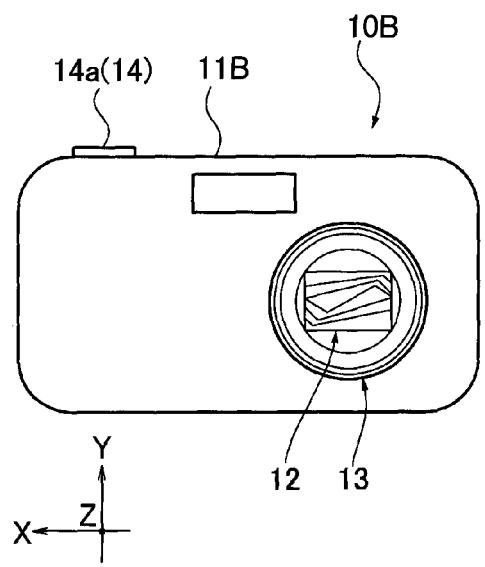
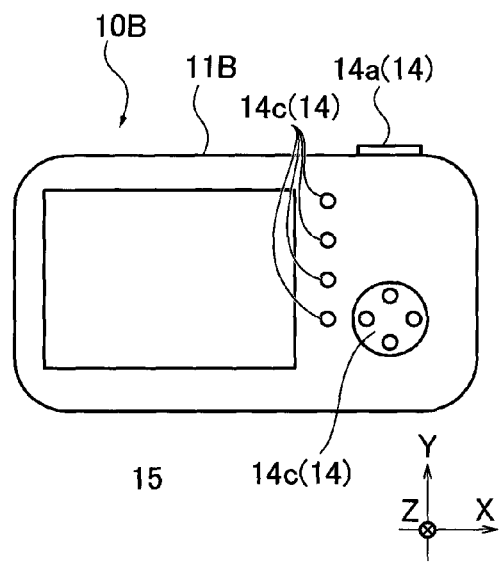

IMAGING DEVICE INCLUDING A BLUR CORRECTING MECHANISM FOR REDUCING THE RADIAL LOAD ON MOVABLE CONNECTORS

CROSS REFERENCE TO RELATED APPLICATION

The present application is based on and claims priority from Japanese Patent Application No. 2011-115471, filed on May 24, 2011, the disclosure of which is hereby incorporated by reference in its entirety.

TECHNICAL FIELD

The present invention relates to an imaging device such as a digital still camera or digital video camera (hereinafter, digital camera) with a blur correcting function to correct camera shakes at shooting.

BACKGROUND ART

A known imaging device generates digital images in accordance with images signals from an image sensor which receives the image of a subject via an optical system. Such an imaging device as a digital camera with a blur correction has been in wide use.

Japanese Patent Application Publication No. 2007-114486 discloses a blur correcting mechanism to move an image sensor on the plane (XY plane) orthogonal to the optical axis (Z axis) of an optical system in accordance with a blur amount of a subject image which occurs by a camera shake. This correcting mechanism includes the image sensor disposed on a mount and a guide stage to move the mount relative to the optical system along the XY plane in a camera body. The guide stage can move the mount by moving bar elements supported in bearings separately provided in the mount and guide stage along the axis of the bar element. The bar elements are provided along the XY plane and extend in orthogonal directions to each other. The mount is moved in the XY plane vertical to the optical axis by a drive force generated from a permanent magnet and a coil, for example.

By moving the mount as above, a rotary force around the axis passing the gravity center occurs on the mount. This is because to move the image sensor in the XY plane, the permanent magnet and coil need to be placed to surround the gravity center of the mount on which the image sensor is disposed along the XY plane. The rotary force may cause a friction between the bar elements and the bearings, which interferes with the movement of the mount or image sensor in the XY plane.

SUMMARY OF THE INVENTION

The present invention aims to provide an imaging device with an improved, smooth blur correcting function.

According to one aspect of the present invention, an imaging device comprises an optical system including one or more optical elements, an image sensor to obtain an image of a subject formed by the optical system, a lens barrel in which the optical elements are mounted, and being movable relative to a device body to move the optical elements along an optical axis, a fixed element at a fixed position in the device body in an orthogonal direction relative to the optical axis, a movable element on which the image sensor is mounted, and being movable relative to the fixed element along a plane vertical to the optical axis, a drive mechanism to generate a drive force by flowing an electric current into a magnetic field, to move the movable element relative to the fixed element, and two or more movable connectors each including a bar element provided in one of the fixed element and the movable element and a bearing provided in the other of the fixed element and the movable element to movably support the bar element along an axis of the bar element, wherein the bar elements of the movable connectors are set to move in different directions from each other along the plane orthogonal to the optical axis, and at least one of the bearings is disposed outside the lens barrel in the orthogonal direction relative to the optical axis.

BRIEF DESCRIPTION OF THE DRAWINGS

Features, embodiments, and advantages of the present invention will become apparent from the following detailed description with reference to the accompanying drawings:

FIG. 16A is a front view of a digital camera according to a second embodiment and FIG. 16B is a back view thereof;

DESCRIPTION OF EMBODIMENTS

Hereinafter, an embodiment of the present invention will be described in detail with reference to the accompanying drawings. Wherever possible, the same reference numbers will be used throughout the drawings to refer to the same or like parts.

First Embodiment

Figure 1A:
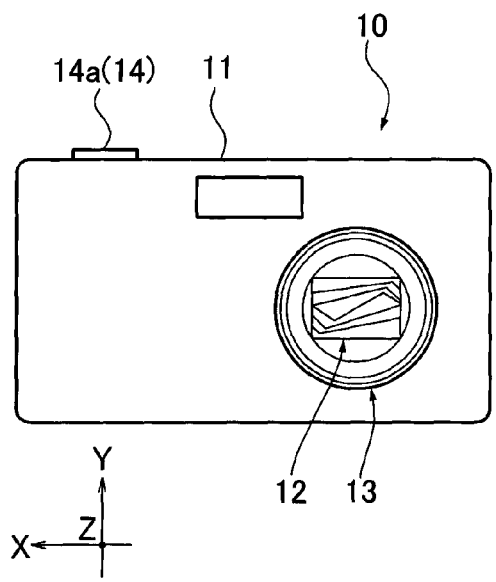
FIG. 1A is a front view of a digital camera as an example of an imaging device according to a first embodiment and FIG. 1B is a back view thereof.
Figure 1B:
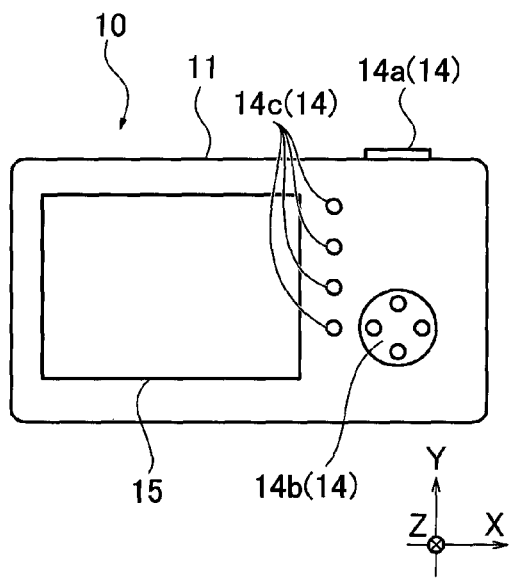

A digital camera 10 according to a first embodiment will be described as an example of an imaging device with reference to FIGS. 1 to 11. In FIG. 1, Z axis is parallel to the optical axis of a lens barrel 13 or an optical system 12 when mounted in a body 11 and a plane orthogonal to the Z axis is referred to as an XY plane. The positive side of the Z axis is the front side of the digital camera 10 while the negative side thereof is the back side of the digital camera 10. X axis is a direction vertical to the optical axis of the optical system 12. The positive side of the X axis is the right side while the negative side thereof is the left side. Y axis is a vertical direction to the optical axis of the optical system 12. The positive side of the Y axis is the top side of the digital camera 10 while the negative side thereof is the bottom side of the digital camera 10.

The digital camera 10 according to the first embodiment includes a blur correcting function to correct a blur in an image by moving an image sensor in a plane orthogonal to the optical axis. The body 11 of the digital camera 10 in FIG. 1 includes, on the front face, a lens barrel 13 in which an optical system 12 is mounted.

The body 11 includes a shutter button 14a on the top face and a direction switch 14b and various switches 14c on the back face. The shutter button 14a, direction switch 14b, switches 14c, and not-shown dials and levers for setting menus constitute an operation unit 14. The body 11 includes on the back face a display unit 15 to display image data captured or stored in a memory.

Figure 2:
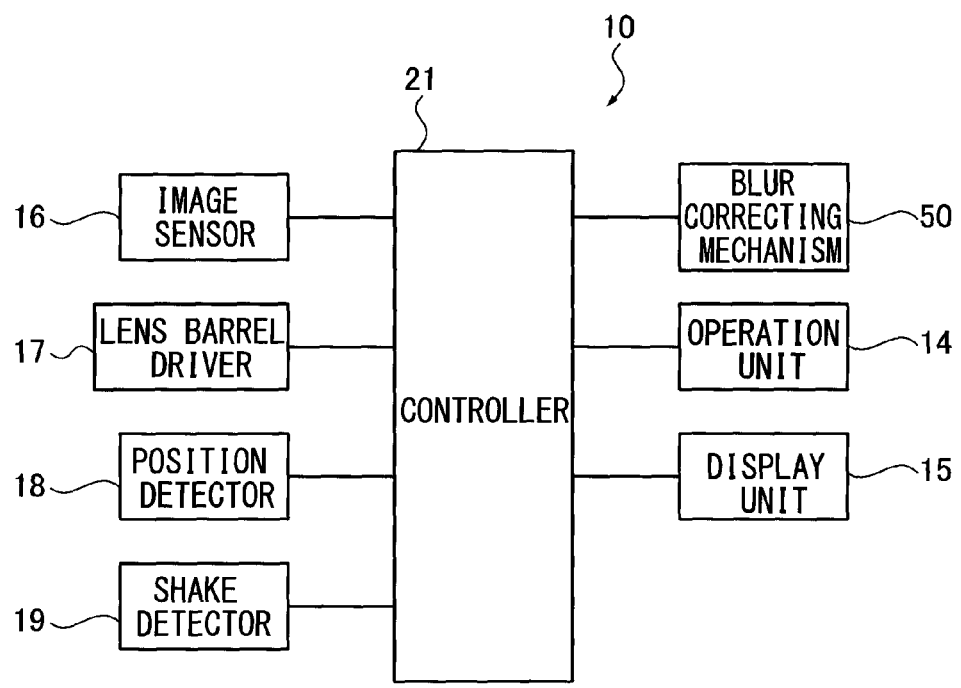
FIG. 2 is a block diagram of the structure of the digital camera

The digital camera 10 in FIG. 2 includes an image sensor 16, a lens barrel driver 17, a position detector 18, a shake detector 19, a blur correcting mechanism 50, and a controller 21. The image sensor 16 is a solid image sensor such as CCD or CMOS image sensor to form a subject image on a light receiving face 16a (FIG. 4) via the optical system 12 and convert it to image data or an electric signal for output. The output electric signal is transmitted to the controller 21.

Figure 4:
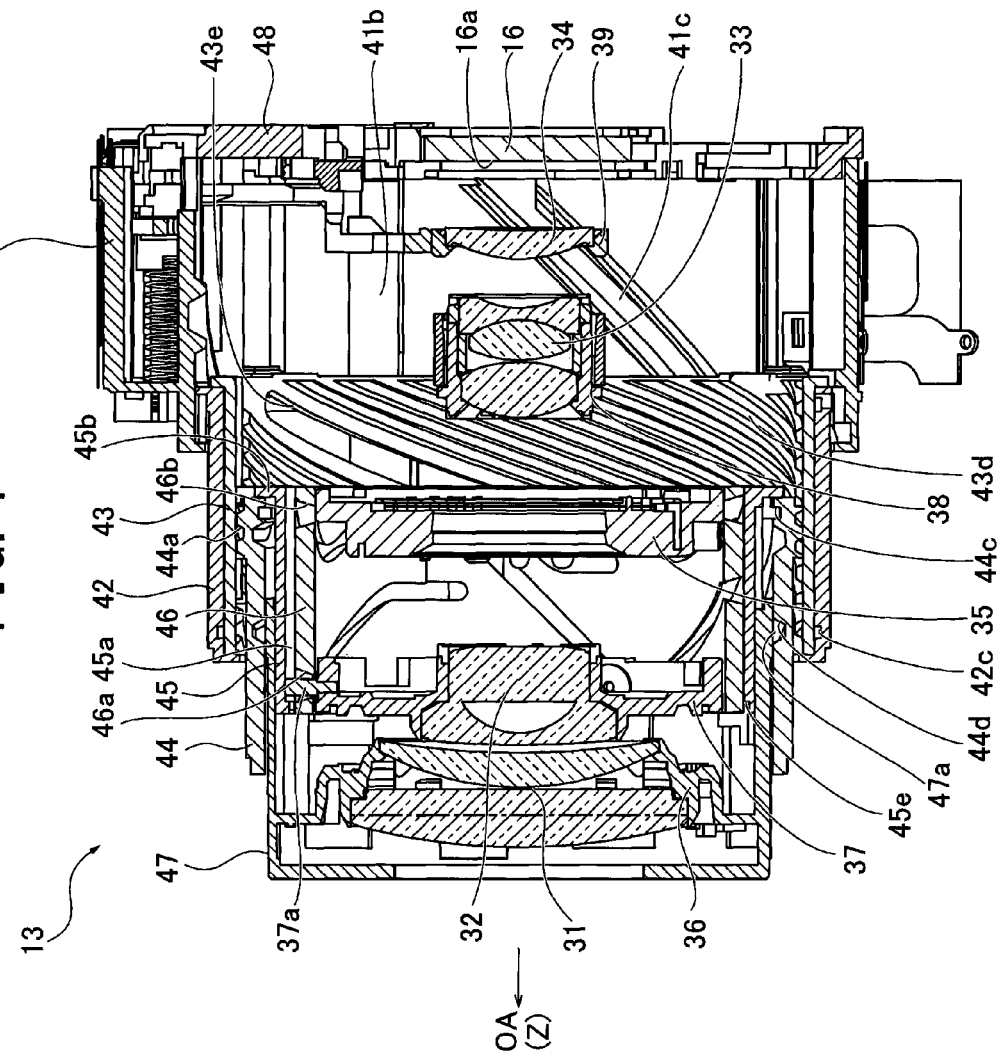
FIG. 4 is a cross section of the lens barrel in a protruded state.

The lens barrel driver 17 moves the frames to hold the elements of the optical system 12 so that the lens barrel 13 (FIG. 10) is brought into a contained state or a standby state (FIG. 4). The position detector 18 is made up of a hall element and mounted on a first guide plate 52 (FIG. 11) to detect the position of the first guide plate 52 relative to a lens barrel base 48. The shake detector 19 is made up of a gyro sensor and mounted in the body 11 to detect a shake of the camera body 11. The shake detector 19 can be an acceleration sensor. The position detector 18 and shake detector 19 output detection signals to the controller 21. They are configured to detect a camera shake in accordance with the moving direction of the image sensor 16 of the blur correcting mechanism 50, which is described later.

The controller 21 drives the relative elements on the basis of a manipulation of the operation unit 14, controls the lens barrel driver 17, display unit 15, blur correcting mechanism 50 and else, and generates image data according to signals from the image sensor 16. The controller 21 acquires an image from the image sensor 16 via the optical system 12 and displays it on the display unit 15 when appropriate.

Figure 3:
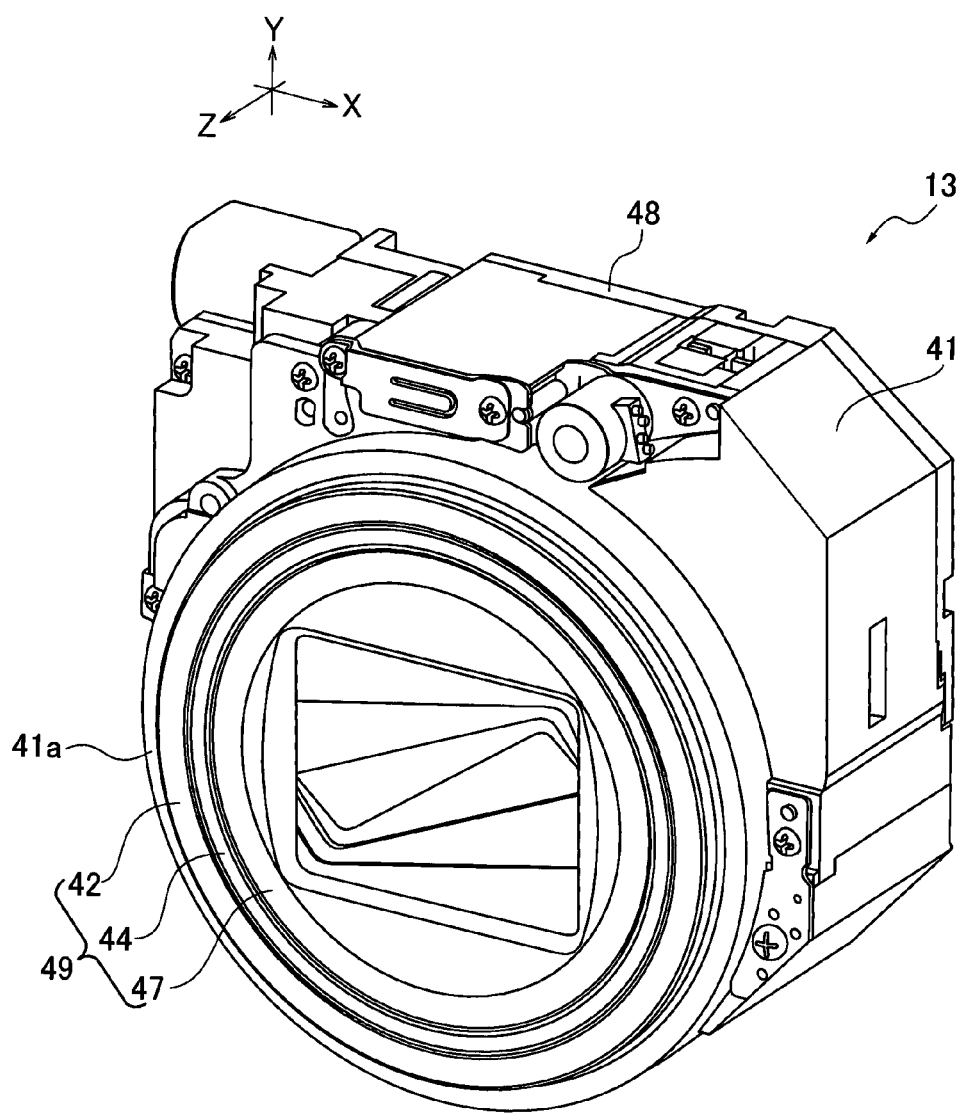
FIG. 3 is a perspective view of a lens barrel in a collapsed state.

Referring to FIGS. 3 to 4, the optical system 12 including the lens barrel 13 comprises first to fourth lens groups 31 to 34, a shutter/diaphragm unit 35, the image sensor 16, first to fourth lens frames 36 to 39, a fixed frame 41, a first rotary cylinder 42, a first liner 43, a second rotary cylinder 44, a second liner 45, a cam cylinder 46, a moving cylinder 47, and a barrel base 48.

At shooting position in FIG. 4, the first to fourth lens groups 31 to 34 are arranged in order from an object side, the shutter/diaphragm unit 35 is placed between the second and third lens groups 32, 33, and the image sensor 16 is placed near the imaging plane side of the fourth lens group 34. The first to fourth lens groups 31 to 34 are a focal length variable zoom lens. Herein, the optical axis is defined to be an optical axis of the optical system or the rotation axis of the optical elements at shooting position.

The first lens group 31 includes one or more lenses, is supported in the first lens frame 36, and fixed in the moving cylinder 47.

The second lens group 32 includes one or more lenses, is supported in the second lens frame 37, and held in the cam cylinder 46 and second liner 45 by inserting a cam follower 37a of the frame 37 into a cam groove 46a of the cam cylinder 46 and a straight groove 45a of the second liner 45. Inserted into the straight groove 45a, the cam follower 37a can interfere with the wall of the straight groove 45a.

The third lens group 33 includes one or more lenses and is supported in the third lens frame 38. Although not shown, it is moved off from the optical axis OA or optical path in a collapsed state while it is placed on the optical axis OA in a shooting state.

The fourth lens group 34 includes one or more lenses and is supported in the fourth lens frame 39. Although not shown, it is moved off from the optical axis OA or optical path in a collapsed state while it is placed on the optical axis OA in a shooting state. In the present embodiment the fourth lens group 34 is a focus lens.

The shutter/diaphragm unit 35 with a not-shown cam follower includes a shutter and an aperture diaphragm, and is supported in the cam cylinder 46 and the second liner 45 by inserting the cam follower into the cam groove 46b of the cam cylinder 46 and the straight groove 45a of the second liner 45. Inserted into the straight groove 45a, the cam follower 37 can interfere with the wall of the straight groove 45a.

The fixed frame 41 contains a fixed cylinder 41a which is fixed at the front of the barrel base 48 in the body 11. The blur correcting mechanism 50 is provided on the barrel base 48. The fixed frame 41 of a quadratic prism includes two sides extending along the X axis and two sides extending along the Y axis. The fixed frame 41 in the first embodiment has two cut-off corners on –X axis side as shown in FIG. 3.

The fixed cylinder 41a includes a straight groove 41b and a cam groove 41c on inner circumference. A not-shown key portion of the first liner 43 is interferably inserted into the straight groove 1b while a cam follower of the first rotary cylinder 42 is interferably inserted into the cam groove 41c. The first rotary cylinder 42 is fitted in the fixed cylinder 41a.

The first rotary cylinder 42 includes, on the outer circumference of a base end, a helicoidal cam follower to insert into the cam groove 41c of the fixed cylinder 41a as well as a gear to transmit the rotary force of the lens barrel driver 17 to the first rotary cylinder 42. On the inner circumference it includes a ring-like guide groove 42c along the plane orthogonal to the optical axis OA and a not-shown straight groove along the optical axis OA.

The first rotary cylinder 42 is provided in the fixed cylinder 41a with a cam follower inserted into the cam groove 41c. It is rotatable around the optical axis OA relative to the fixed cylinder 41a and the barrel base 48. It is moved in rotation to the optical axis OA, guided by the cam follower and the cam groove 41c. The first liner 43 is fitted in the first rotary cylinder 42.

The first liner 43 includes, on the outer circumference, a not-shown key portion to insert into the straight groove 41b of the fixed cylinder 41a and a follower radially protruding to insert into the guide groove 42c of the first rotary cylinder 42. Because of this, the first rotary cylinder 42 and the first liner 43 are movable together along the optical axis OA relative to the fixed cylinder 41a while they are relatively rotatable around the optical axis OA. The first liner 43 functions as a guide cylinder and fitted in the first rotary cylinder 42.

Also, the first liner 43 has, on the inner surface, a straight groove along the optical axis, a helicoid 43d which is engaged with a later-described helicoid 44a of the second rotary cylinder 44, and a helicoidal undercut 43e penetrating through the wall of the first liner 43.

The second rotary cylinder 44 fitted in the first liner 43 includes the helicoid 44a on the outer circumference of a base end to engage with the helicoid 43d of the first liner 43, as well as a cam follower to insert into a straight groove on the inner circumference of the first rotary cylinder 42 through the undercut 43e of the first liner 43.

Thus, along with the rotation of the first rotary cylinder 42 around the optical axis, the cam follower of the second rotary cylinder 44 is pressed by the straight groove of the first rotary cylinder 42 to rotate the second rotary cylinder 44 about the optical axis. Since the first liner 43 is prevented from rotating by the engagement of the key portion and the straight groove 41b of the fixed cylinder 41a, the second rotary cylinder 44 can be moved along the optical axis OA relative to the first liner 43, guided by the helicoids 43d, 44a, as described above.

On the inner circumference the second rotary cylinder 44 includes a guide groove 44c along the plane orthogonal to the optical axis OA and a cam groove 44d for moving the moving cylinder 47. Because of this, the second liner 45 and second rotary cylinder 44 are moved together along the optical axis OA while they are relatively rotated around the optical axis OA.

The second liner 45 is fitted in the second rotary cylinder 44 and includes a key 45b radially protruding outward from the back end and contacting the back end of the second rotary cylinder 44. The tip of the key 45b is inserted into the straight groove of the first liner 43.

Further, the second liner 45 includes, on the outer circumference, a follower or key protruding radially outward and a straight groove extending along the axis. The follower or key functions as a guide when inserted into the guide groove 44c of the second rotary cylinder 44, to transmit only the moving force of the moving and rotating second rotary cylinder 44 to the second liner 45. Therefore, the second liner 45 and the second rotary cylinder 44 are moved together along the optical axis OA relative to the first liner 43 while prevented from rotating around the optical axis OA.

The second liner 45 includes, on the inner circumference, a straight groove 45a along the optical axis OA and a guide groove 45e along the plane orthogonal to the optical axis OA. The cam follower 37a of the second lens frame 37 and the cam follower of the shutter/diaphragm unit 35 are inserted into the straight groove 45a. A follower or key of the cam cylinder 46 is inserted into the guide groove 45e. The cam cylinder 46 with a protrusion is fitted in the inner circumference of the second liner 45 and rotated together with the second rotary cylinder 44 with the protrusion fitted into the base end of the second rotary cylinder 44. Thus, the cam cylinder 46 and the second liner 45 are moved together along the optical axis OA while relatively rotated around the optical axis OA.

The bottom end of the moving cylinder 47 is inserted between the second liner 45 and the second rotary cylinder 44. The moving cylinder 47 includes a cam follower 47a protruding on the outer circumference of a base end to insert into the cam groove 44d of the second rotary cylinder 44. It includes, on the inner circumference, a key portion to insert into the straight groove in the outer circumference of the second liner 45. Thus, the moving cylinder 47 can be moved relative to the second liner 45 along the optical axis OA while prevented from rotating about the optical axis OA.

In the lens barrel 13 the first rotary cylinder 42 is rotated by the force of the lens barrel driver 17 transmitted via the gears. In the collapsed state in FIG. 10 it is moved in rotation to an object side relative to the fixed cylinder 41a, guided by the cam follower and the cam groove 41c. Further, the rotation of the first rotary cylinder 42 presses the cam follower of the second rotary cylinder 44 to rotate the second rotary cylinder 44 around the optical axis and move it along the optical axis OA relative to the first liner 43, guided by the helicoids 43d, 44a of the first liner 43 not in rotation. Thus, along with the rotation of the first rotary cylinder 42, first liner 43, and second rotary cylinder 44, the second liner 45, cam cylinder 46, and moving cylinder 47 are rotated or moved forward or backward when appropriate to thereby move the first to third lens groups 31 to 33 in the first and third lens frames 36 to 38 and the shutter/diaphragm unit 35 on the optical axis for zooming. The fourth lens group 34 in the fourth lens frame 39 performs focusing.

In the lens barrel 13 the first rotary cylinder 42, second rotary cylinder 44, and moving cylinder 47 function as a lens barrel 49 in FIG. 3 movable along the optical axis OA inside the fixed cylinder 41a. Further, the lens barrel driver 17 and a spline gear function as a drive source for the movable lens barrel 49 and for the lens frames.

Figure 5:
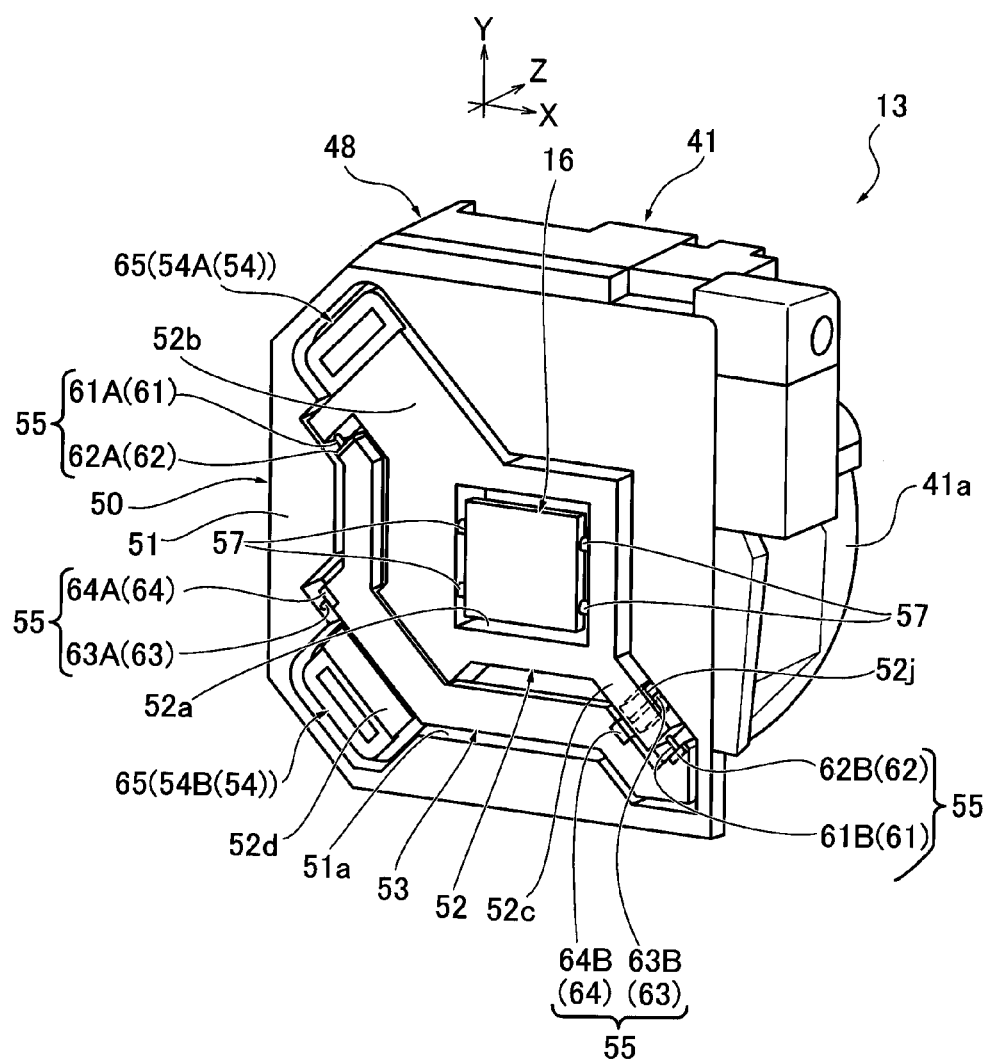
FIG. 5 is a perspective view of a back side of the lens barrel or blur correcting mechanism.
Figure 6:
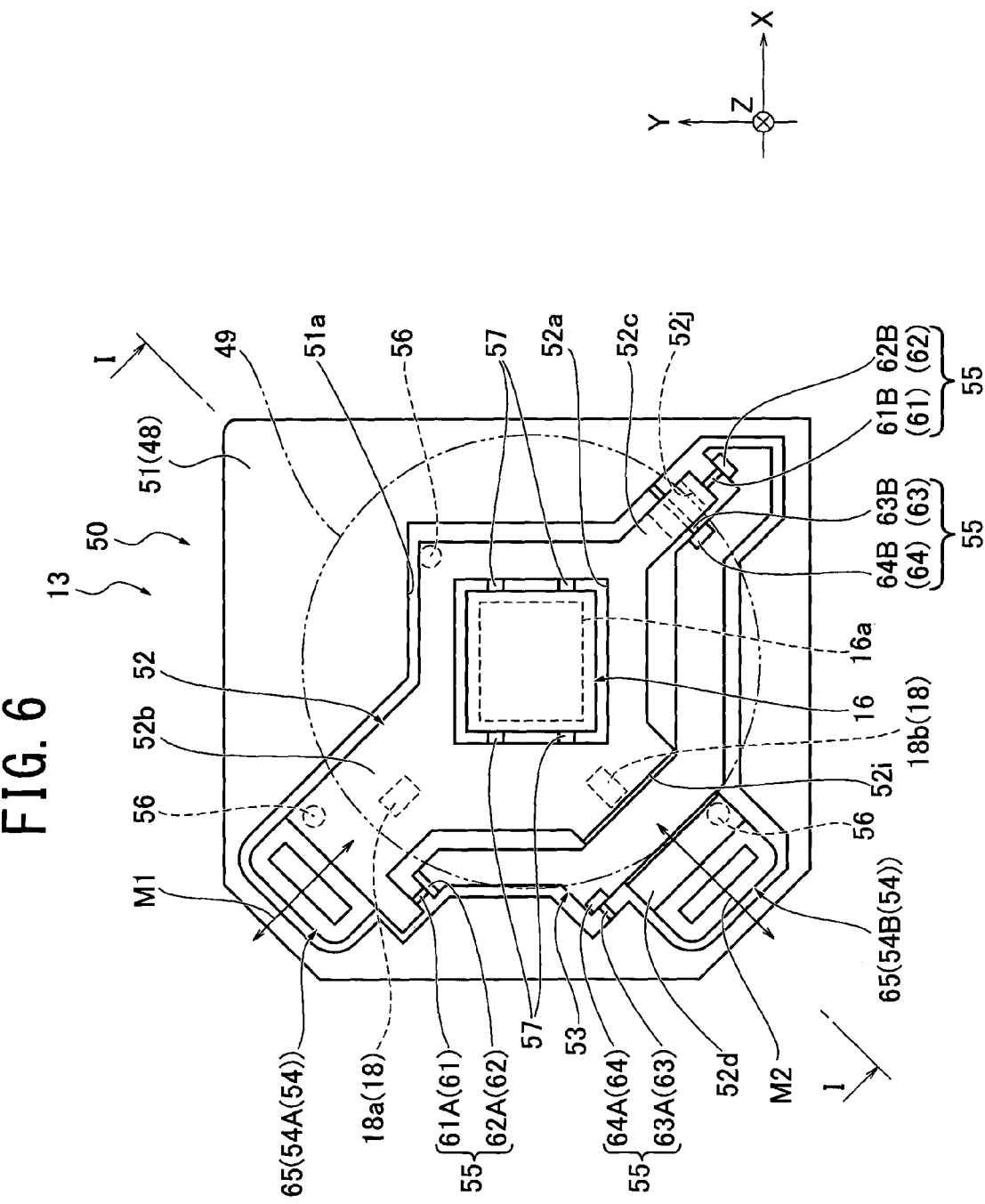
FIG. 6 shows the back side of the lens barrel.

Next, the features of the digital camera 10 are described with reference to FIGS. 1 to 11. According to the digital camera 10 the blur correcting mechanism 50 is provided on the barrel base 48 on which the fixed cylinder 41a is mounted, and fixed inside the body 11 together with the lens barrel 13 in FIG. 11. The blur correcting mechanism 50 includes a base 51, a first guide plate 52, a second guide plate 53, the drive mechanism 54 in FIG. 10, movable connectors 55, and support balls 56 as shown in FIGS. 5, 6.

Figure 7A:
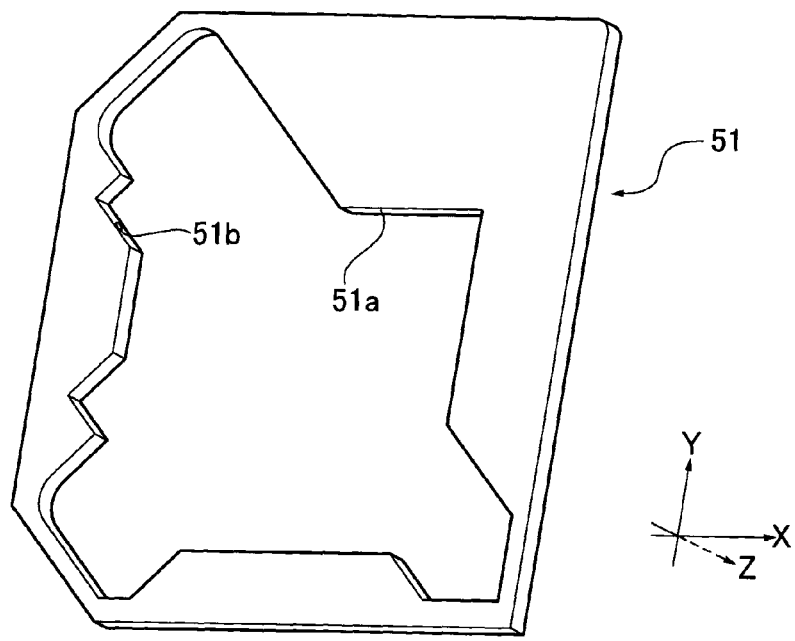
FIG. 7A shows the back side of a base, seen from +X axis side
Figure 7B:
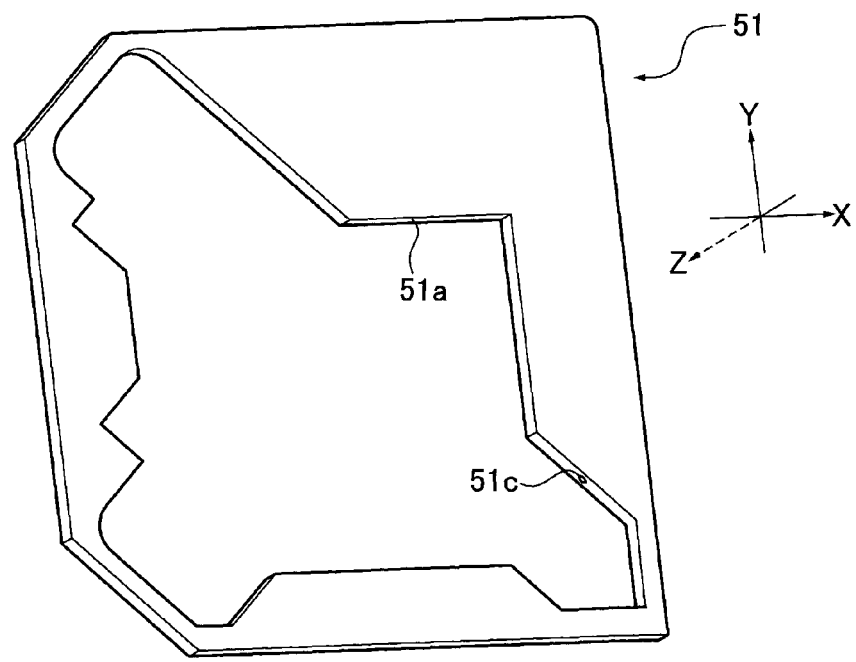
FIG. 7B shows the same, seen from −X axis side.

The base 51 as a fixed element forms a part of the barrel base 48 and is at a fixed position on the optical axis OA relative to the body 11 and the fixed cylinder 41a. In FIGS. 7A, 7B the base 51 is a square plate having two cut-off corners and disposed along the XY plane orthogonal to the optical axis OA.

The base 51 has a through hole 51a along the Z axis or optical axis OA and expanding to the three corners, two of which are on one diagonal line as a first direction M1 and one of which is on the other diagonal line as a second direction M2. The through hole 51a includes a first small hole 51b and a second small hole 51c in the inner circumference into which second bar elements 63A, 63B are pressed. The two second bar elements 63A, 63B extend in the second direction M2.

Figure 8A:
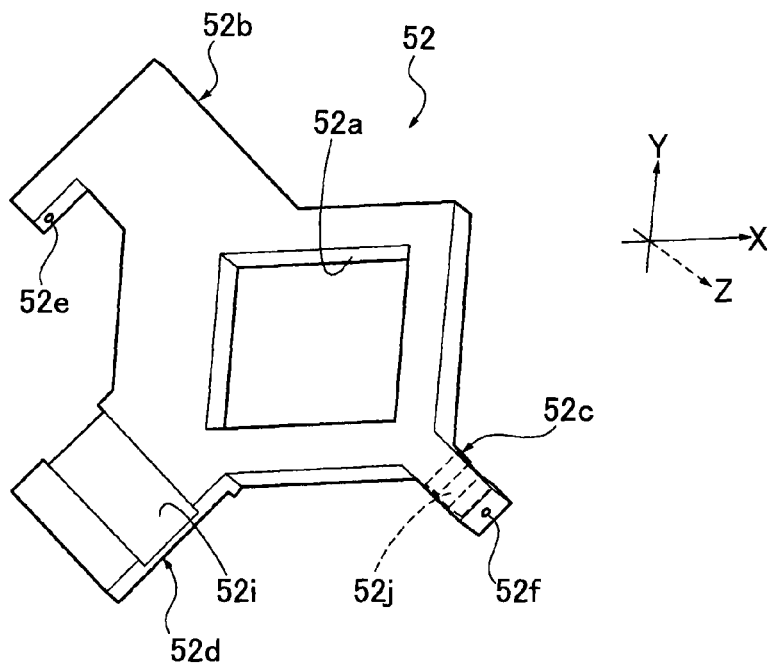
FIG. 8A shows the back side of a first guide plate, seen from +X axis side
Figure 8B:
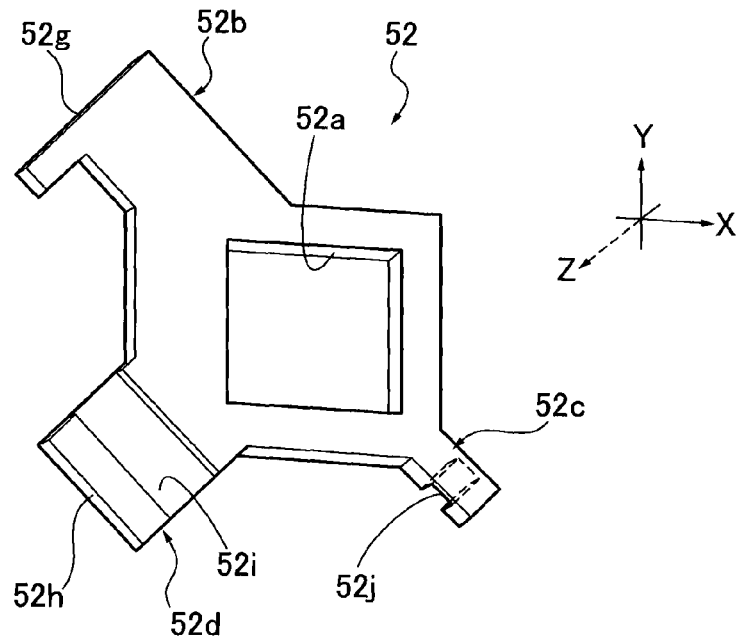
FIG. 8B shows the front side thereof, seen from −X axis side.

The first guide plate 52 is placed inside the through hole 51a along the XY plane orthogonal to the optical axis OA in FIG. 8. It is rectangular and includes at the center a through hole 52a of a size to receive the image sensor 16 with a light receiving face 16a orthogonal to the optical axis OA. In the present embodiment the image sensor 16 is attached to the through hole 52a via an adhesive layer 57.

The first guide plate 52 in FIG. 8 includes three arm portions 52b, 52c, 52d in association with the corner portions of the through hole 51a. The arm portions 52b, 52c, 52d extend in a direction inclined at 45 degrees relative to the X axis and Y axis. The arm portions 52b, 52c extend on the same straight line. The extending direction of the arm portions 52b, 52c is defined to be the first direction M1 while that of the arm portion 52d is defined to be the second direction M2.

The arm portions 52b, 52c form a connection between the first and second guide plates 52, 53. In FIG. 8A the arm portion 52 includes a first small hole 52e and a second small hole 52f extending in the first direction M1 into which first bar elements 61A, 61B are pressed, respectively as shown in FIGS. 5, 6.

Also, the drive mechanism 54 is mounted on the arm portions 52b, 52d. In the first embodiment first and second coils 65, 66 to generate electric current for the drive mechanism 54 are mounted thereon. The arm portions 52b, 52c include mounting planes 52g, 52h extending in the second direction M2 along the Z axis, respectively. The first coil 65 of a first driver 54A and the second coil 66 of a second driver 54B to generate a drive force in the first direction M1 are provided on the mounting planes 52g, 52h, respectively.

The arm portion 52d includes, about the middle portion, a concave 52i extending over both ends of the arm portion 52d. The concave 52i is formed to align a thin portion 53a of the second guide plate 53 with the Z axis.

Likewise, the arm portion 52c includes, about the middle portion, a concave 52j extending both ends of the arm portion 52c. The second bar element 53B is inserted through the concave 52j in the second direction M2. The first guide plate 52 is connected to the second guide plate 53 via the movable connectors 55.

Figure 9A:
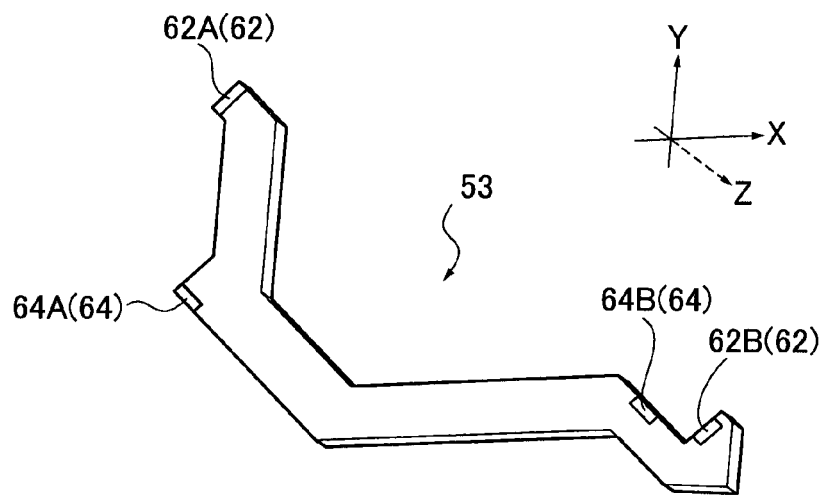
FIG. 9A shows the back side of a second guide plate, seen from +X axis side
Figure 9B:
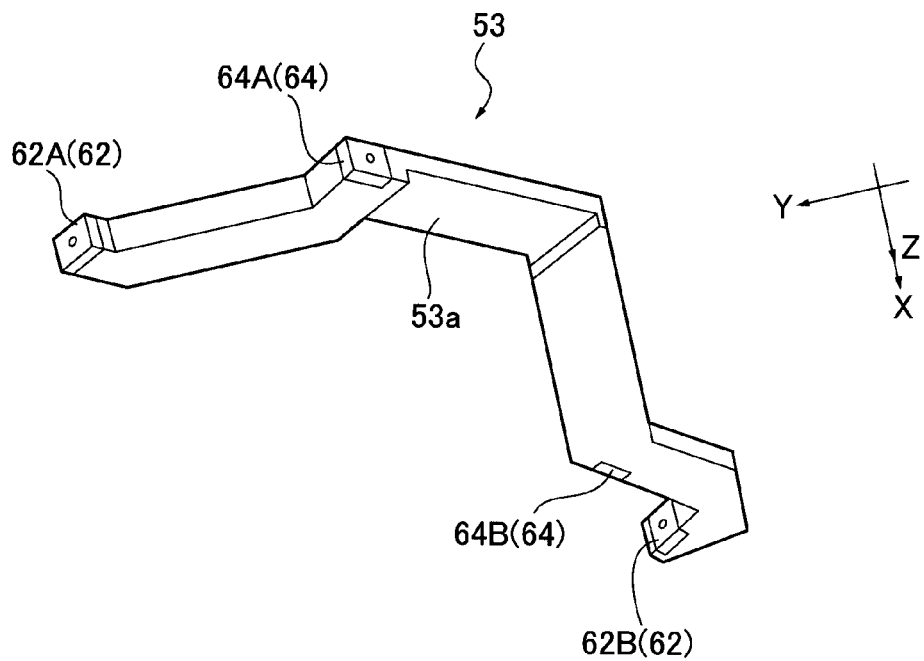
FIG. 9B shows the same, seen from +Y axis side.

The second guide plate 53 in FIG. 9A is a bent band-like element and provided along the XY plane. It includes in the longitudinal middle portion the thin portion 53a extending in the first direction M1, as shown in FIG. 9B.

Further, the second guide plate 53 includes a first bearing 62A at one end and a first bearing 62B at the other end. The first bearing 62A supports the first bar element 61A pressed into the small hole 52e of the arm portion 52b and allows it to move in the first direction M1. The first bearing 62B supports the first bar element 61B pressed into the small hole 52f of the arm portion 52c and allows it to move in the first direction M1. In the first embodiment while the second guide plate 53 is connected with the base 51, the first bearings 62A, 62B are provided outside the maximal diameter of the movable lens barrel 49 as a circle indicated by a two-dotted and dashed line in FIG. 6.

In addition, the two first bearings 62A, 62B are positioned so that a straight line connecting therebetween coincides or aligns with the drive force of the first driver 54A of the drive mechanism 54 in the first direction M1 to act on the first guide plate 52. Specifically, with the gravity center of the first guide plate 52 coincident with the center of the image sensor 16, the straight line connecting the two bearings are made approximately in parallel to the first direction M1 and the center of the straight line is positioned at a small distance to the gravity center. In other words, the two first bearings 62A, 62B are placed on the same straight line in the first direction M1 passing the gravity center. The gravity center of the first guide plate 52 can be arbitrarily set in accordance with the structure of the first guide plate 52 or the mount position of the image sensor 16.

Further, the second guide plate 53 includes second bearings 64A, 64B. The second bearing 64A is provided near the thin portion 53a at one end of the second guide plate 53 to support the second bar element 63A pressed into the small hole 51b of the through hole 51a and allow it to move in the second direction M2. The second bearing 64B is provided near the first bearing 62B at the other end in FIG. 9 to support the second bar element 63B pressed into the small hole 51c of the through hole 51a and allow it to move in the second direction M2. The second bar element 63A is disposed outside the maximal diameter of the movable lens barrel 49 seen from the XY plane when the second guide plate 53 and the base 51 are connected each other. Also, the second bearing 64B is disposed near the maximal diameter of the lens barrel 49.

The blur correcting mechanism 50 is configured that the second guide plate 53 is coupled with the base 51 by the second bar element 63A supported in the second bearing 64A and the second bar element 63B supported in the second bearing 64B. The two second bearings 64A, 64B movably support the second bar elements 63 in the second direction M2 so that the second guide plate 53 can move in the second direction M2 relative to the base 51.

The second guide plate 53 is connected with the first guide plate 52 by the first bar element 61A supported in the first bearing 62A and the first bar element 61B supported in the first bearing 62B. The two first bearings 62 movably support the first bar elements 61 in the first direction M1, respectively so that the first guide plate 52 can move in the second direction M2 relative to the second guide plate 53.

According to the blur correcting mechanism 50 the first guide plate 52 can be moved relative to the base 51 along the XY plane including both the first and second directions M1, M2. Because of this, the image sensor 16 can be moved orthogonally relative to the optical axis OA. Thus, the first and second guide plates 52, 53 function as a movable element to movably support the image sensor 16 relative to the base 51 along the plane orthogonal to the optical axis OA. Further, the two first bearings 62 and the first bar elements 61 function as the first movable connector 55A to move the movable element in the first direction M1. The two second bearings 64 and the two second bar elements 63 function as the second movable connector 55B to move the movable element in the second direction M2.

As shown in FIG. 6, the blur correcting mechanism 50 includes three rotatable support balls 56 on the surface of the barrel base 48 on which the optical system 12 is mounted. The support balls 56 are configured to movably support the surface of the first guide plate 52 on the same plane along the XY plane. The first guide plate 52 works to stably and smoothly move the first guide plate 52 relative to the base 51 along the XY plane.

The blur correcting mechanism 50 comprises the drive mechanism 54 in FIGS. 5, 6 to move the image sensor 16 along the plane orthogonal to the optical axis OA. In the first embodiment the drive mechanism 54 includes the first and second drivers 54A, 54B to move the first guide plate 52 relative to the base 51 in the first and second directions M1, M2, respectively. The first driver 54A is disposed on a first straight line which is inclined at 45 degrees vertically and the second driver 54B is disposed on a second straight line orthogonal to the first straight line when the digital camera 10 or body 11 takes a reference posture with the optical axis OA set in horizontal direction and the Y axis set in vertical direction. The first straight line coincides with the first direction M1 while the second straight line coincides with the second direction M2. Further, the first and second drivers 54A, 54B are positioned to move the first guide plate 52 toward the gravity center of the first guide plate 52. The structures of the first and second drivers 54A, 54B are the same except for the directions of the drive force to the first guide plate 52. Therefore, only the structure of the second driver 54B will be described in the following.

Figure 10:
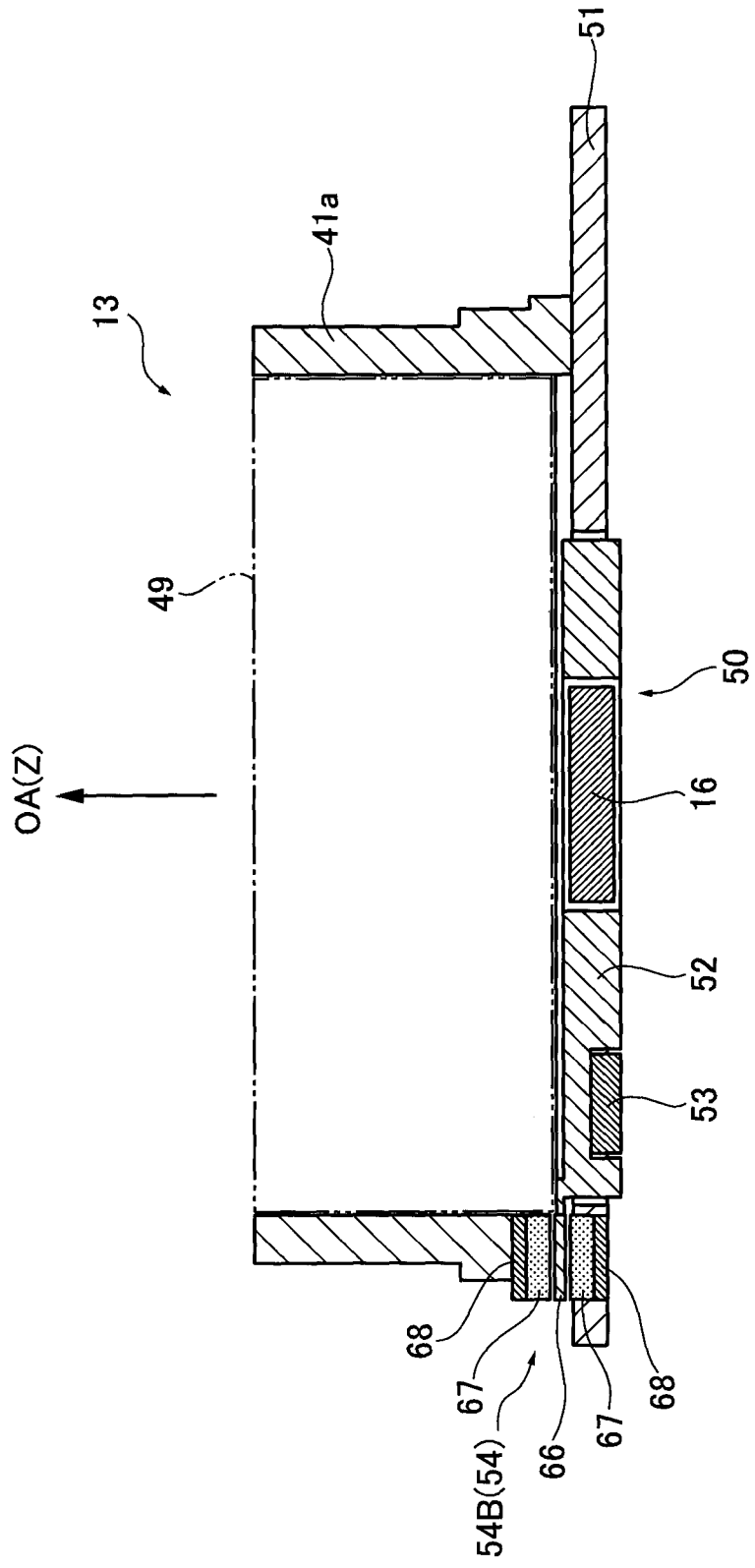
FIG. 10 is a cross section of a drive mechanism and a second driver along I to I line in FIG. 6.

In FIG. 10 the second driver 54B includes the second coil 66, a second magnet pair 67, and a second yoke pair 68. As described above, the second driver 54B is disposed outside the maximal diameter of the movable lens barrel 49 and the second coil 66 is mounted on the mounting plane 52h of the arm portion 52d of the first guide plate 52. In the first embodiment the second coil 66 has a rectangular shape with curved short sides and includes a pair of straight portions extending in the first direction M1 and a pair of curved portions extending over the straight portions.

The second magnet pair 67 is provided on the fixed frame 41 between the fixed cylinder 41a and the barrel base 48 outside the maximal diameter of the movable lens barrel 49, placing the second coil 66 therebetween on the Z axis. The second yoke pair 67 corresponds with the second magnet pair 67 to amplify the magnetic force thereof.

By applying electric current to the second coil 66, the second driver 54B generates a drive force to move the second coil 66 to the magnetic field of the second magnet pair 67 and the second yoke pair 67 in the second direction M2. Likewise, the first driver 54A generates a drive force to move the first coil 65 to the magnetic field of a first magnet pair and a first yoke pair in the first direction M1. Since the first and second coils 65, 66 are provided on the first guide plate 52 and the second magnet pair 67, second yoke pair 67, first magnet pair, and first yoke pair are provided in the fixed frame 41, the drive mechanism 54 can drive the first guide plate 52 in the first and second directions M1, M2 relative to the fixed frame 41 and the barrel base 48. Moreover, with the first and second coils 65, 66, the image sensor 16 is moved along the plane orthogonal to the optical axis OA relative to the fixed cylinder 41a in FIGS. 5, 6.

The digital camera 10 comprises the position detector 18 and the shake detector 19 for blur correction. Referring to FIG. 6 to FIG. 11, the position detector 18 is provided on the first guide plate 52 and includes a first detector element 18a and a second detector element 18b which are configured to detect the moving amount of the first guide plate 52 in the first and second directions M1, M2 relative to the base 51 or barrel base 48 along the XY plane, respectively. The first and second detector elements 18a, 18b output detection signals to the controller 21.

Figure 11:
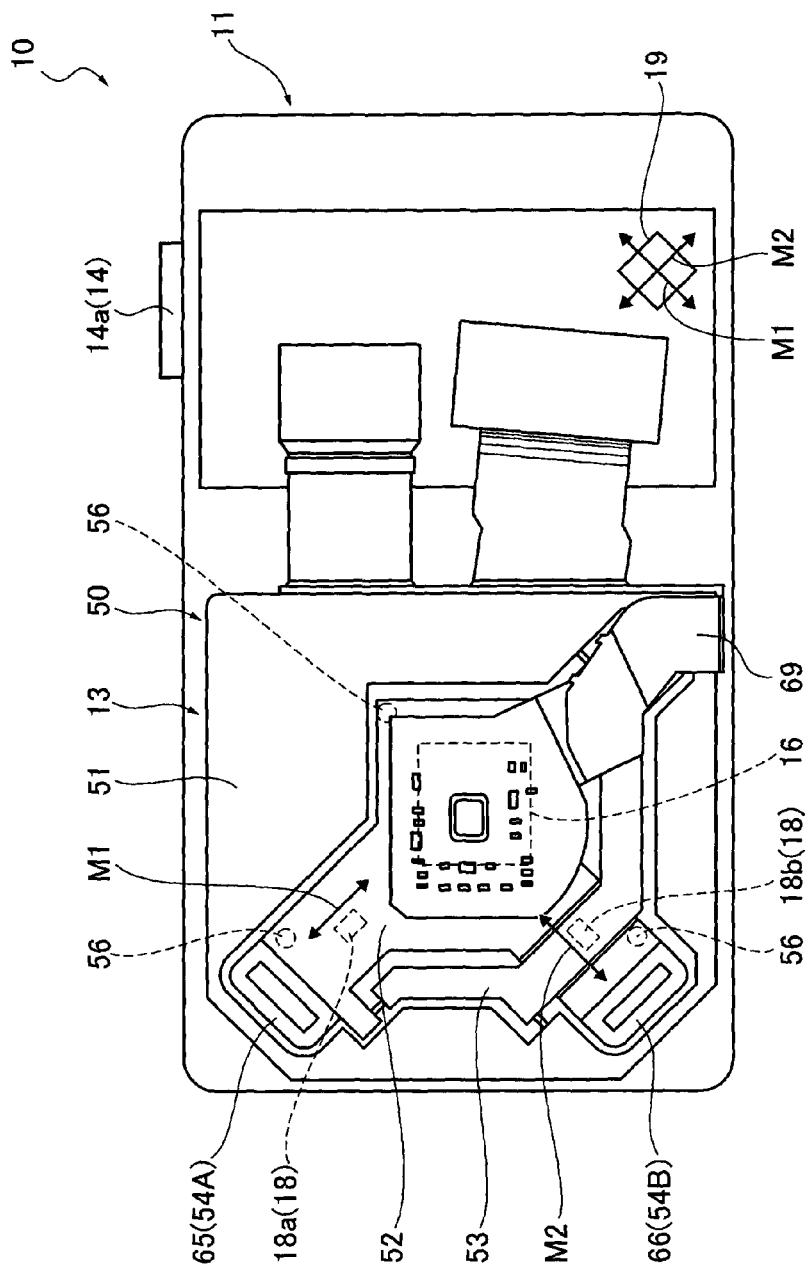
FIG. 11 shows the lens barrel incorporated in a body.

The shake detector 19 in FIG. 11 is positioned in the body 11 separately from the lens barrel 13 and the blur correcting mechanism 50. It is configured to detect the moving amount of the digital camera 10 in the first and second directions M1, M2 along the XY plane. The shake detector 19 outputs detection signals to the controller 21.

In the blur correcting mechanism 50 a flexible substrate 69 is attached on the back face of the image sensor 16 provided on the first guide plate 52, to electrically connect the image sensor 16 and blur correcting mechanism 50 with the controller 21. The blur correcting mechanism 50 with the lens barrel 13 are contained in the body 11, and the lens barrel 13 is placed in the body 11 so that the three faces of the fixed frame 41 orthogonal to the optical axis OA contact the three inner faces of the body 11. The two cut-off corners of the fixed frame 41 come at the two X axis corners of the body 11.

In accordance with detected shake information from the shake detector 19, the controller 21 controls the applied current to the coils 65, 66 of the drive mechanism 54 to properly generate drive force to the magnets 67 and yokes 68. By this drive force, the first guide plate 52 and image sensor 16 are moved in the first direction M1 and the second guide plate 53 in the second direction M2 to negate camera shakes. The controller 21 is configured to set the original position of the first guide plate 52 in the XY plane, set a target position on the basis of detected shake data from the shake detector 19, calculate moving direction and amount to the target position, and move the first guide plate 52 by the moving amount in the direction. The blur correcting mechanism 50 performs servo control to accurately move the first guide plate 52 to the target position according to position data from the position detector 18. The blur correcting mechanism 50 thus performs blur correction by moving the first guide plate 52 on the XY plane to move the image sensor 16, following the movement of a subject image due to a camera shake.

In prior art blur correcting mechanism the image sensor is moved on the plane orthogonal to the optical axis by bar elements movably supported in bearings. A problem of a blur correcting mechanism 80 is described with reference to FIG. 12. A square movable element 81 on which an image sensor is mounted is moved along the XY plane relative to a fixed element 84. The movable element 81 includes an X bar element 82 movably supported by an X bearing on the X axis and a Y bar element 83 movably supported by a Y bearing on the Y axis. A drive mechanism 85 includes a first driver 85A and a second driver 85B and is provided between the movable element 81 and fixed element 84. As in the blur correcting mechanism 50, the first driver 85A drives the movable element 81 in the first direction M1 and the second driver 85B drives it in the second direction M2 relative to the fixed element 84. The gravity center Cg of the movable element 81 is on the optical axis OA and coincides with the center of the square.

The first driver 85A generates a drive force F1 in the first direction M1 and the second driver 85B generates a drive force F2 in the second direction M2 to move the movable element 81 to −Y axis. The drive force F1 is divided to an X axis force F1x and a Y axis force F1y. The drive force F2 is divided to an X axis force F2x and a Y axis force F2y. The drive mechanism 85 applies the drive force F of the Y axis forces F1y, F2y combined to a middle position Pf between the first and second drivers 85A, 85B. This causes a rotary force to act on the movable element 81. The rotary force is the drive force F multiplied by a distance Lf between the middle position Pf and the gravity center Cg. The rotary force causes a radial load on the X bar element 82 and the X bearing in the direction orthogonal to the X bar element 82, which causes a friction therebetween and prevents the smooth movement of the movable element relative to the fixed element 84. An increased amount of drive force of the drive mechanism is needed to smoothly move the movable element 81.

Meanwhile, the blur correcting mechanism 50 according to the first embodiment includes the first and second movable connectors 55A, 55B in FIG. 6 to movably connect the first and second guide plates 52, 53 along the plane orthogonal to the optical axis OA. Further, the first bearings 62A, 62B of the first movable element 55A and the second bar element 63A of the second movable connector 55B are disposed outside the maximal diameter of the movable lens barrel 49 on the XY plane, and the second bearing 64B of the second movable connector 55B is disposed near the maximal diameter of the movable lens barrel 49. This can reduce the radial load on the two pairs of first bearings 62 and first bar elements 61 and on the two pairs of second bearings 64 and second bar elements 63 due to the drive force to the first guide plate 52.

Figure 12:
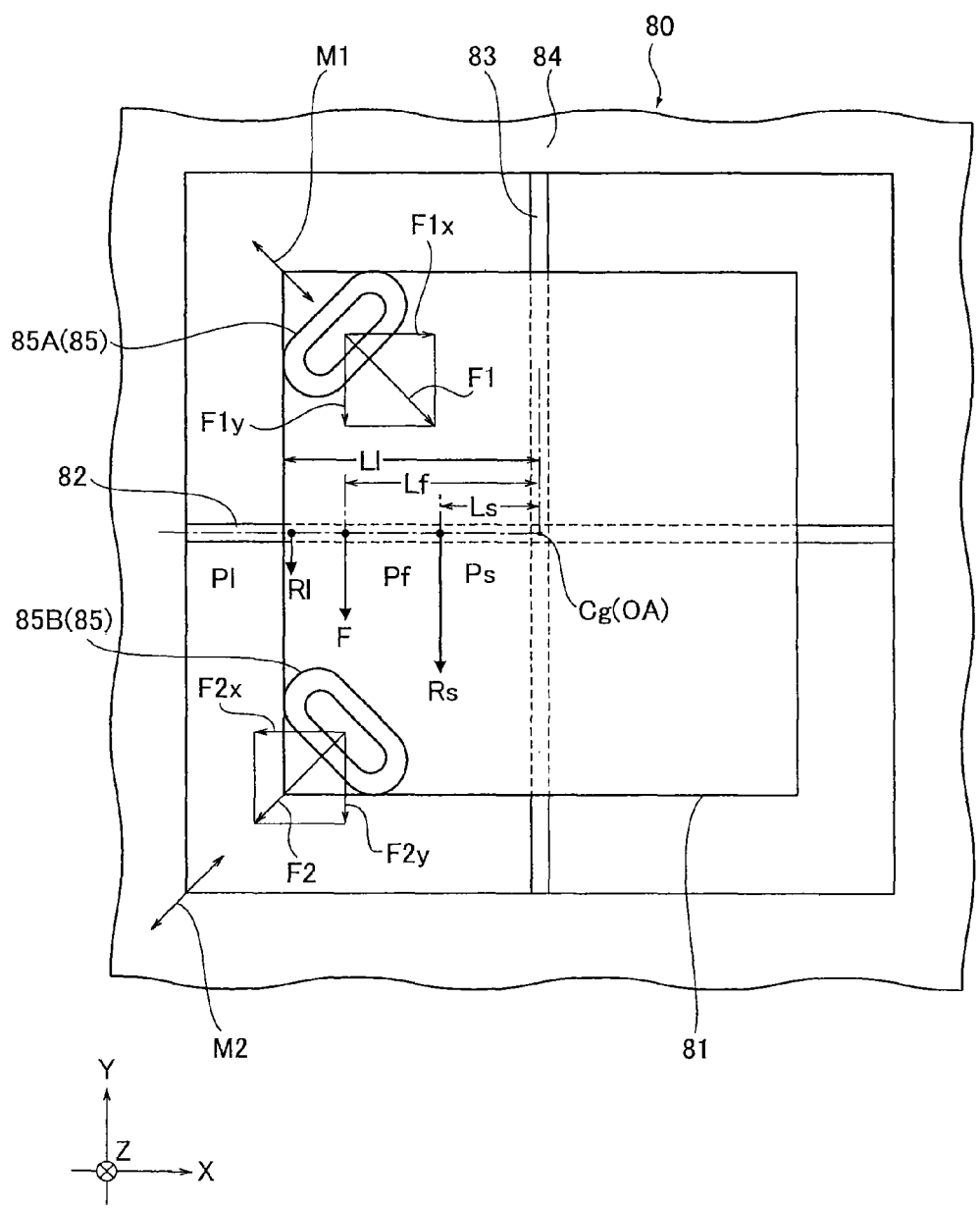
FIG. 12 shows a prior art blur correcting mechanism.

Specifically, referring to the blur correcting mechanism 80 in FIG. 12, the radial load on the X bar element 82 and X bearing (not shown) varies according to the distance from the gravity center Cg on the X axis. For example, a radial load Rs acts on the X bearing and X bar element 82 when the position Ps of the X bearing is at a short distance Ls from the gravity center Cg on the X bar element 82. A radial load R1 acts on the X bearing and X bar element 82 when the position P1 of the X bearing is at a long distance L1 therefrom. With the X bearing at the position Ps, the equation, drive force F*distance Lf=distance Ls*radial load Rs is found by moment balance equations with the rotary force onto the movable element 81. Likewise, with the X bearing at the position P1, the equation, drive force F*distance Lf=distance L1*radial load R1 is found. The rotary force (F*Lf) onto the movable element 81 is constant while the radial load Rs is larger than the radial load R1 since the distance Ls is smaller than the distance L1. Because of this, the radial load can be varied in accordance with the distance from the gravity center Cg on the X axis such that the larger the distance between the bearing position and the gravity center, the smaller the radial load on the X bar element 82 and X bearing.

In the prior art blur correcting mechanism, however, the bar elements and bearings equivalent to the movable connectors 55 are provided near the image sensor not to prevent the image sensor from receiving a subject image. In comparison therewith, according to the blur correcting mechanism 50 the positions at which the two first bearings 62 support the corresponding first bar elements 61 are sufficiently separated from the gravity center of the first guide plate 52 in the first direction M1. Thus, in the blur correcting mechanism 50 it is possible to reduce the radial load on the two first bearings 62 and the corresponding bar elements 61 and on the two second bearings 64 and the corresponding bar elements 63 and effectively reduce the friction therebetween.

Accordingly, the digital camera 10 is able to smoothly move the first guide plate 52 (movable element) on which the image sensor 16 is mounted relative to the base 51 (fixed element) and properly perform blur correction.

Further, since both the first bearing 62A and first bearing 62B are provided outside the maximal diameter of the movable lens barrel 49, the amounts of radial load on the first bearing 62A and first bar element 61A and on the first bearing 62B and first bar element 61B can be balanced and reduced.

In addition, the second bearing 64B is disposed near the maximal diameter of the movable lens barrel 49 along the XY plane. Therefore, the amounts of radial load on the first bearing 62A and first bar element 61A and on the first bearing 62B and first bar element 61B can be further balanced and reduced.

According to the digital camera 10, it is made possible to prevent an increase in the drive force of the drive mechanism 54 by smoothly moving the first guide plate 52 relative to the base 51.

Figure 13A:
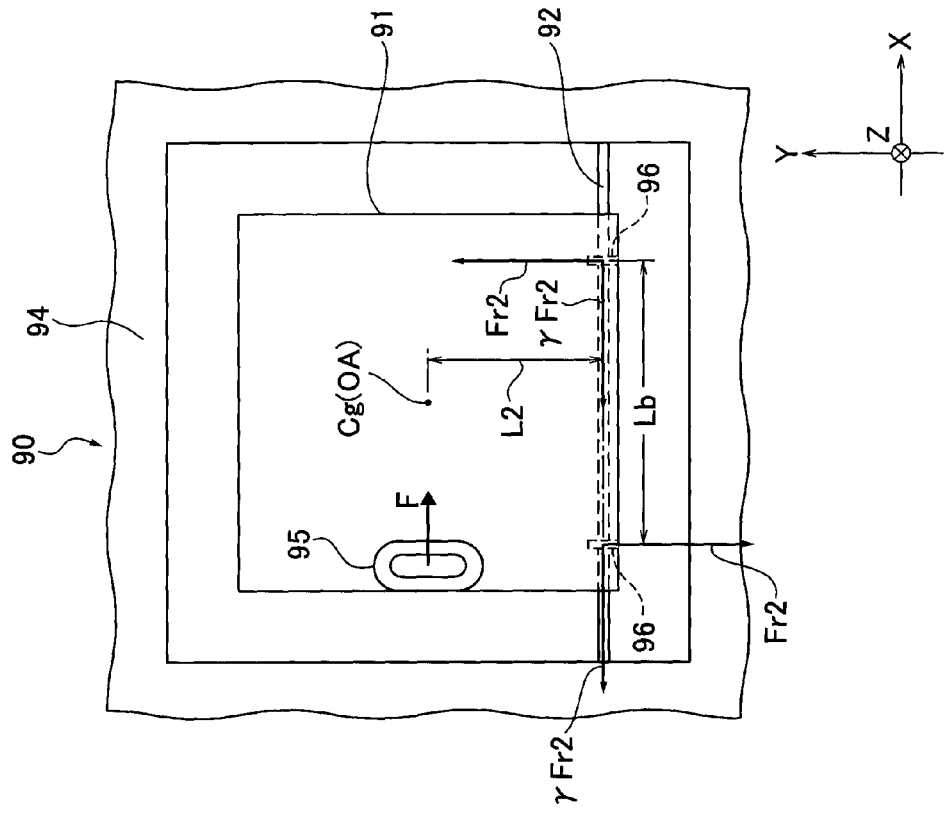
FIG. 13A shows another blur correcting mechanism when the middle point of a straight line connecting two X axis bearings is placed with a distance L1 from the gravity center and FIG. 13B shows the same when it is placed with a distance L2 from the gravity center.
Figure 13B:
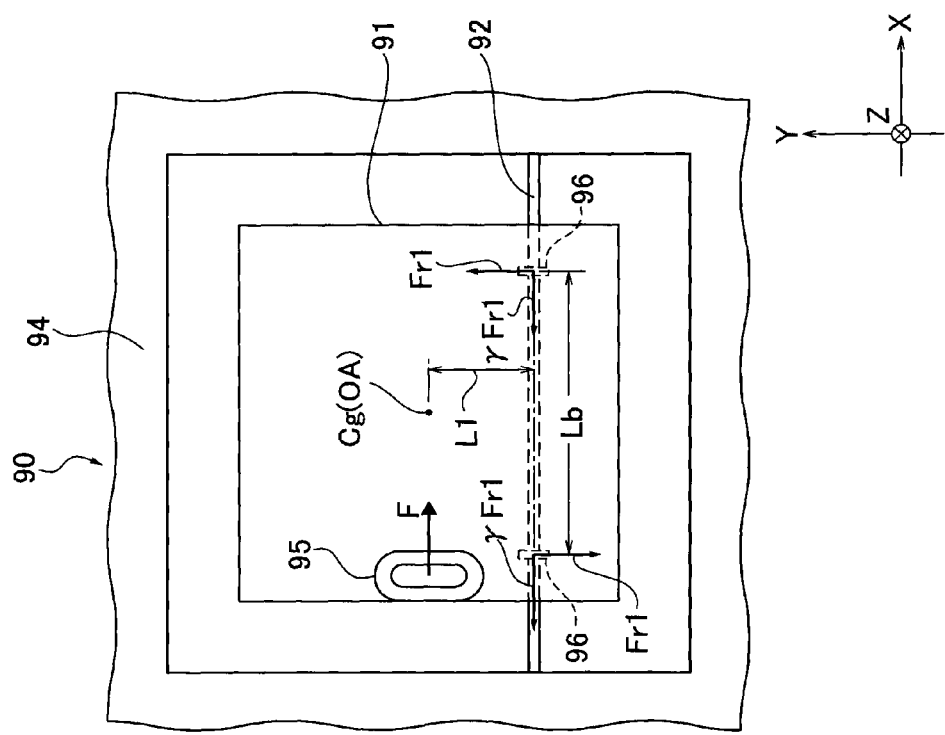
Figure 14:
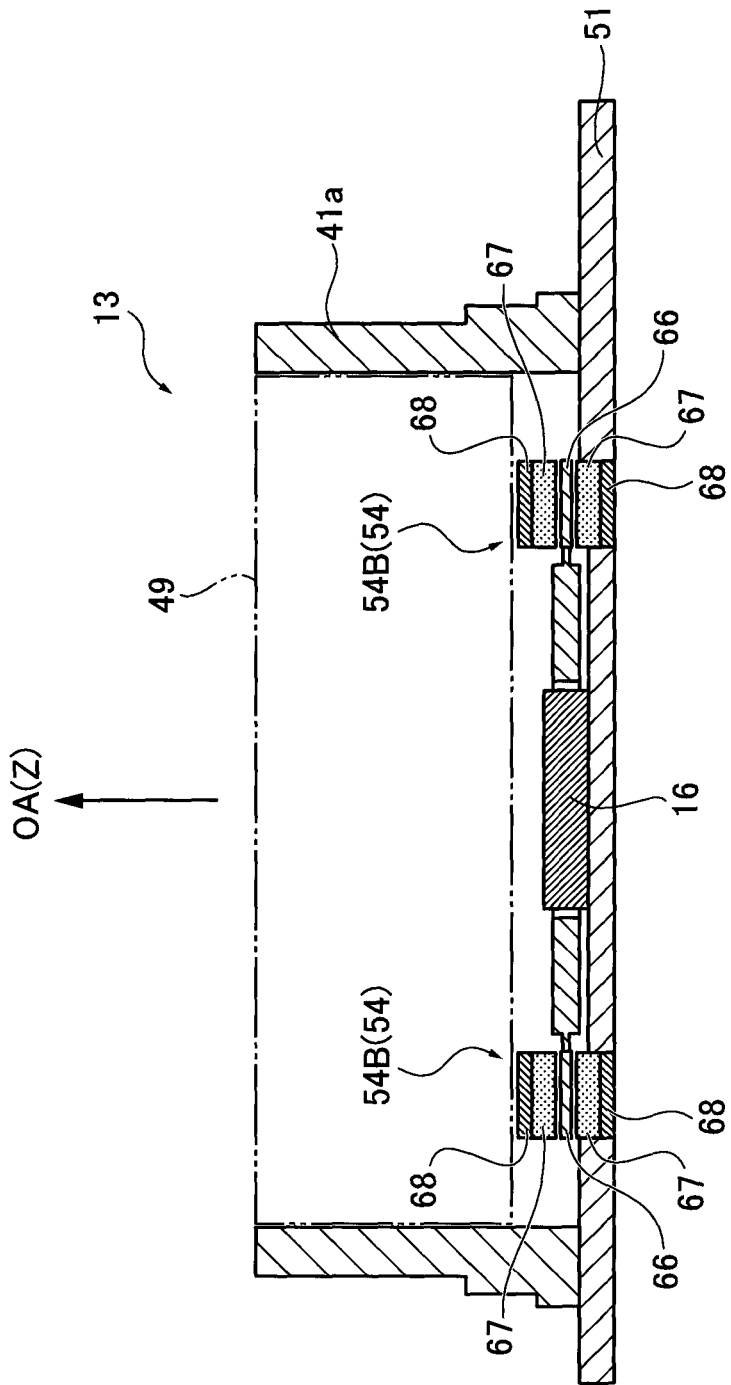
FIG. 14 shows the drive mechanism provided inside the maximal diameter of the lens barrel.

In the digital camera 10 the first bearing 62A and first bearing 62B are positioned so that the straight line connecting therebetween is aligned with the vector of the drive force of the first driver 54A onto the first guide plate 52 in the first direction M1. This can further reduce the friction between the two first bearings 62 and the corresponding bar elements 61. This is described with reference to a blur correcting mechanism 90 in FIGS. 13A, 13B. In the drawings the blur correcting mechanism 90 includes an image sensor on a square movable element 91 movable relative to a fixed element 91 by X bar elements 92 along the XY plane and a drive mechanism 95 between the movable element 91 and the fixed element 94. The movable element 91 includes X bar elements 92 movably supported by X bearings 96. The drive mechanism 95 generates a drive force to the movable element 91 along the X axis. The center of the movable element 91 is the gravity center Cg along the XY plane. A difference between FIGS. 13A and 13B is in the distances L1, L2 between the gravity center Cg of the movable element 91 and the middle points of straight lines connecting the two X bearings 96. When the drive mechanism 95 generates a drive force F to move the movable element 91 along the +X axis, the movable element 91 is rotated to move the X bearing 96 at +X axis side along −Y axis and moves the X bearing 96 at −X axis side along +Y axis. The X bar elements 92 causes reactive force Fr1, Fr2 against the X bearings 96 along the Y axis, which causes friction γFr1, γFr2 therebetween to −X axis. The friction is proportional to the reactive force Fr1, Fr2 in FIGS. 13A, 13B. When the straight line connecting the X bar elements 92 and X bearings 96 is placed at a distance L1 from the gravity center Cg in FIG. 13A, the equation, drive force*distance L1=distance Lb*reactive force Fr1 is found by moment balance equations with the rotary force onto the movable element 91. Likewise, with the straight line in question placed at a distance L2 in FIG. 13B, the equation, drive force*distance L2=distance Lb*reactive force Fr2 is found by the moment balance equations. While the drive force F and the distance Lb are constant, the distance L1 is smaller than the distance L2 and the reactive force Fr1 is smaller than the reactive force Fr2. Thus, the reactive force from the X bar elements 92 to the X bearings 96 is varied in accordance with the distance between the gravity center Cg and the straight line connecting the X bearings 96 such that the smaller the distance, the smaller the reactive force. Accordingly, the friction between the X bar elements 92 and X bearings 96 can be reduced by the alignment of the straight line with the vector of the drive force F to the movable element 91. In the first embodiment the first bearing 62A and the first bearing 62B as the first movable connector 55A are positioned so that the straight line therebetween is approximately parallel to the first direction M1, and the distance from the center of the straight line to the gravity center is shortened. This can achieve a further reduction in the friction between the two first bearings 62 and first bar elements 61. It is preferable to set the straight line connecting the two first bearings 62 in the first direction M1 at a short distance to the gravity center from the center. More preferably, the straight line passes the gravity center and coincides with the first direction M1.

The digital camera 10 can accurately perform blur correction by moving the first guide plate 52 along the XY plane efficiently since the first and second directions M1, M2 are set to be orthogonal to each other.

According to the digital camera 10, the drive mechanism 54 is disposed outside the maximal diameter of the movable lens barrel 49 or first rotary cylinder 42 along the XY plane, so that the lens barrel 13 and the digital camera 10 can be decreased in thickness. If the drive mechanism 54 is provided inside the maximal diameter of the movable lens barrel 49, the thickness of the movable lens barrel 49 in a contained state is increased by the thickness of the drive mechanism 54.

Figure 15A:
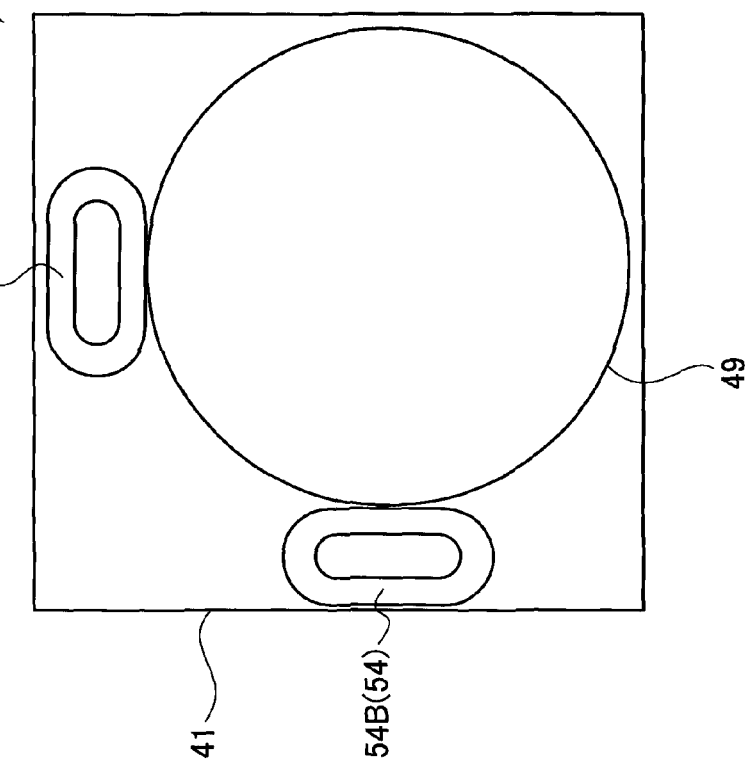
FIG. 15A shows a first driver on Y axis and a second driver on X axis and FIG. 15B shows the first driver on a first straight line or in a first direction and the second driver on a second straight line or in a second direction.
Figure 15B:
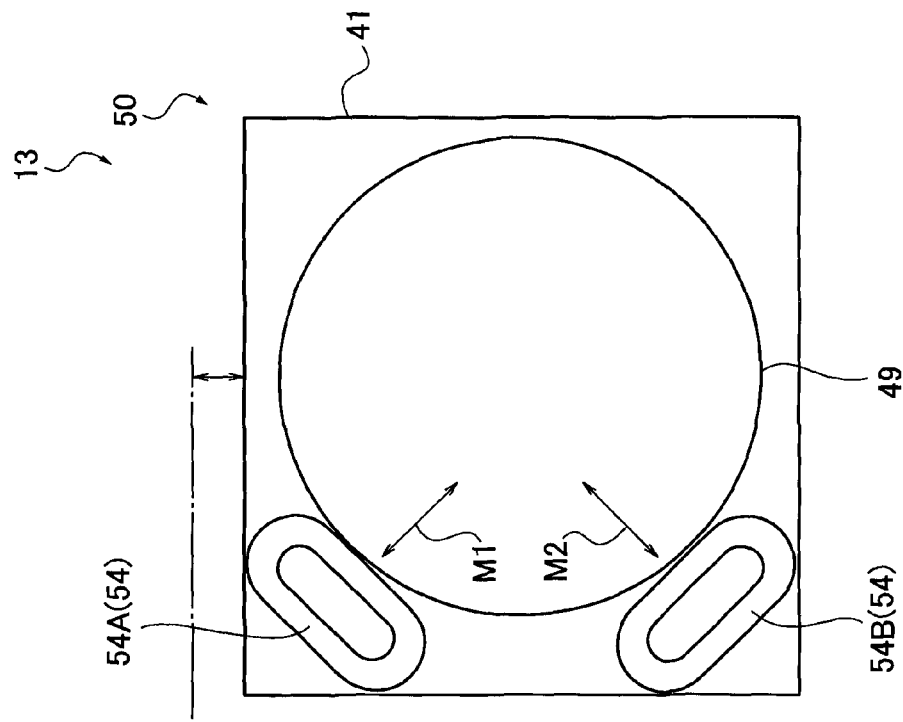

Referring to FIG. 15A, the first driver 54A can be placed on the Y axis and the second driver 54B on the X axis outside the maximal diameter of the movable lens barrel 49. However, this results in increasing the size of the fixed frame 41 by the size of the first driver 54A along the X axis and by the size of the second driver 54B along the Y axis. Meanwhile, in the blur correcting mechanism 50 in FIG. 15B the first driver 54A is placed on the first straight line as the first direction M1 and the second driver 54B is placed on the second straight line as the second direction M2 outside the maximal diameter of the movable lens barrel 49. Because of this, the fixed frame 41 can be of a square shape having two X-axis sides and two Y-axis sides extending closely to the maximal diameter of the fixed cylinder 41a. This enables the corner spaces of the fixed frame 41 on the first and second straight lines to be used for placing the drive mechanism 54, thereby preventing an increase in the size of the blur correcting mechanism. This is especially effective since the lens barrel driver 17 needs to be provided around the movable lens barrel 49 in the lens barrel 13.

Moreover, according to the digital camera 10 the first direction M1 is set to be vertically inclined at 45 degrees and the second direction M2 is orthogonal to the first direction M1 while the body 11 takes the reference posture. Therefore, the moving direction of the first guide plate 52 relative to the base 51 can be made coincident with the drive force of the drive mechanism 54 to the first guide plate 52 with the first and second drivers 54A, 54B placed on the first and second straight lines, respectively. Accordingly, it is possible to smoothly move the first guide plate 52 on which the image sensor 16 is mounted relative to the base 51.

Further, the fixed frame 41 including the blur correcting mechanism is contained in the body 11 so that the three faces thereof contact the three inner surfaces of the body 11. This makes it possible to fit the two corners of the fixed frame 41 on the first and second straight lines in the two corners of the body 11. This results in efficiently using the space in the body 11 to contain the drive mechanism 54, which can prevent an increase in the size of the digital camera 10.

Since the first and second drivers 54A, 54B are positioned to apply the drive force to the gravity center of the first guide plate 52, the digital camera 10 can accurately correct blurs in images by efficiently moving the image sensor 16 on the first guide plate 52 along the XY plane.

According to the digital camera 10, the detection direction of the first detector element 18a coincides with the drive force of the first driver 54A to the first guide plate 52, and that of the second detector element 18b coincides with the drive force of the second driver 54B to the first guide plate 52. Because of this, it is possible to accurately set the drive force of the drive mechanism 54 in accordance with detected position data on the first guide plate 52 relative to the base 51. Further, it is possible to adjust the position of the image sensor 16 relative to the base 51 on the XY plane by accurate servo control based on the position data from the position detector 18.

Moreover, the detection direction of the shake detector 19 is set to the moving direction of the first bearings 62 and the first bar elements 61 and that of the second bearings 64 and the second bar elements 63. This makes it possible for the controller 21 to accurately calculate the moving amount to the target position, and properly control the applied current to the coils 65, 66 on the basis of detected shake data from the shake detector 19.

Thus, the digital camera 10 as imaging device can perform blur correction smoothly and accurately.

Second Embodiment

Figure 17:
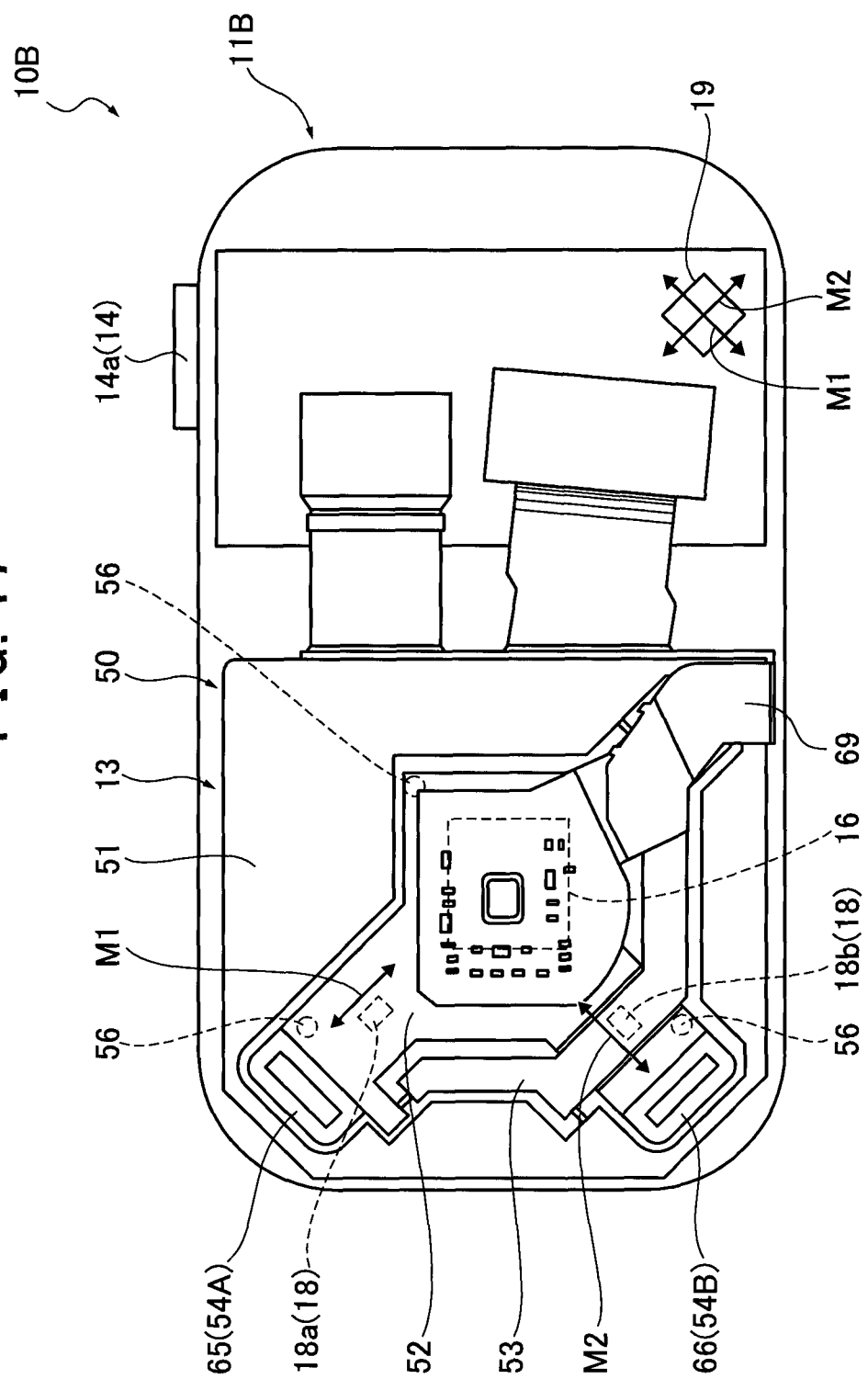
FIG. 17 shows the lens barrel or blur correcting mechanism accommodated in the body of the digital camera.

Next, a digital camera 10B as an imaging device according to a second embodiment is described with reference to FIGS. 16A, 16B, 17. The digital camera 10B is different from that 10A in the first embodiment in the outer form. The rest of the structure is basically the same as that in the first embodiment so that a detailed description thereof is omitted. FIGS. 16A, 16B show a body 11B of the digital camera 10B and FIG. 17 shows the lens barrel 13 and blur correcting mechanism 50 contained in the body 11B.

The body 11B of the digital camera 10B includes four R-curved corners so that it has a compact visual appearance, compared with the digital camera 10 in FIG. 1.

Similarly to the digital camera 10, the lens barrel 13 including the blur correcting mechanism 50 is mounted inside the body 11B. The fixed frame 41 is formed to have two curved corners in line with the R-curved corners of the body 11B to prevent interference between them.

The digital camera 10B can achieve the same effects as those of the digital camera 10 in the first embodiment.

In addition, owing to the efficient use of the space inside the fixed frame 41, the two corners of the fixed frame 41 on −Y axis can be cut off. Because of this, it is possible to prevent the curved corners of the body 11B from interfering with the corners of the fixed frame 41 even if the fixed frame 41 is accommodated at −Y axis side of the body 11B in a biased manner. Moreover, the four corners of the fixed frame 41 can be curved because of the two cut-off corners of the fixed frame 41. Thus, the body 11B or the digital camera 10B can have a compact visual appearance.

Thus, the digital camera 10B as imaging device can smoothly and accurately perform blur correction.

Third Embodiment

Figure 18:
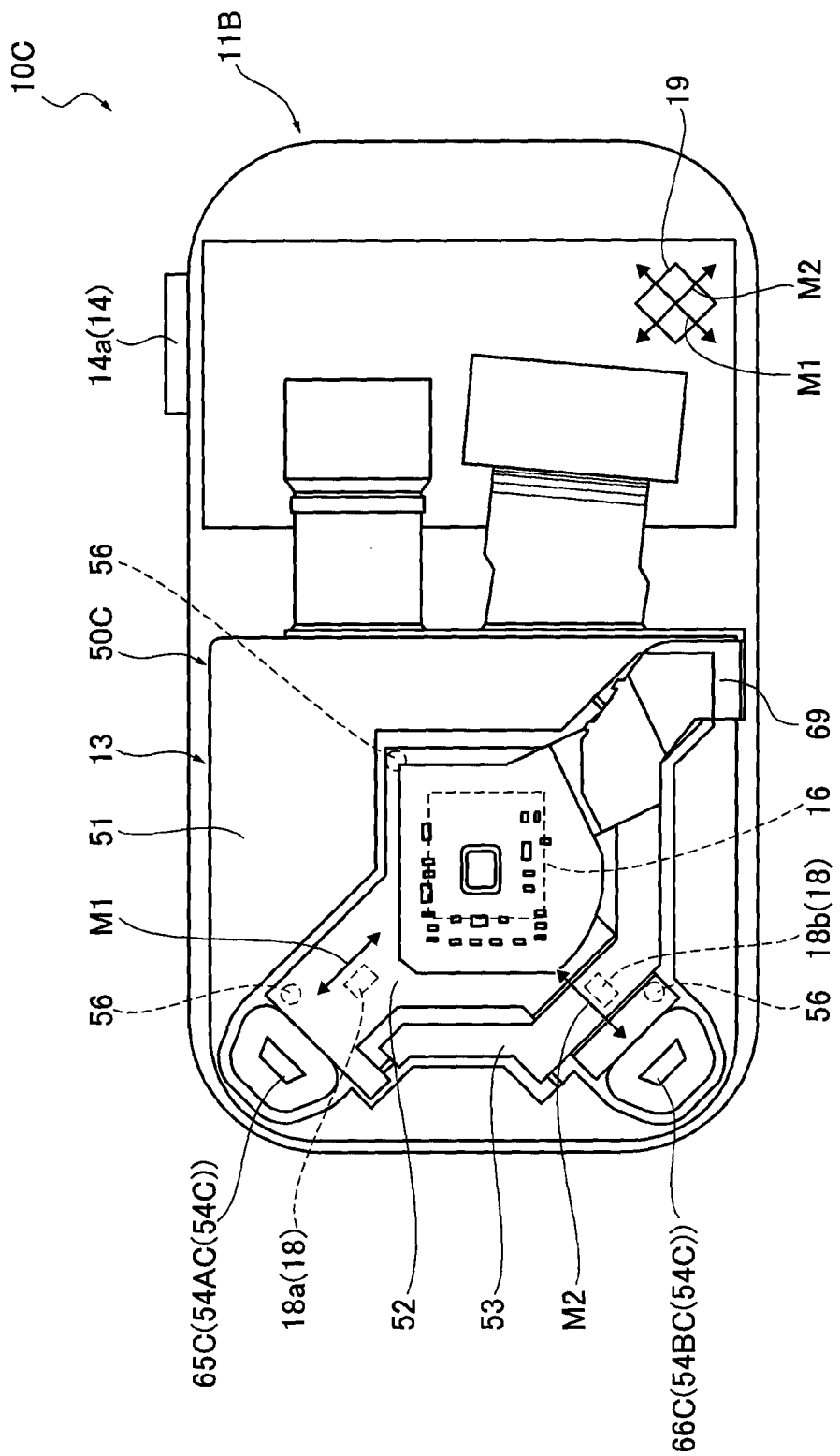
FIG. 18 shows the lens barrel or blur correcting mechanism accommodated in the body of a digital camera according to a third embodiment.
Figure 19A:
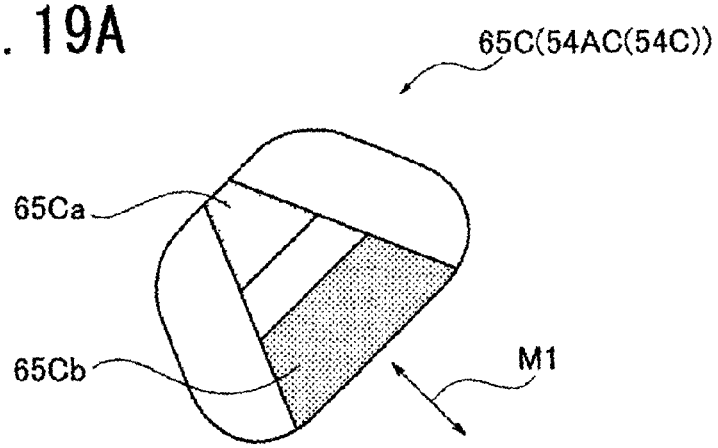
FIG. 19A shows a first coil along Z axis.
Figure 19B:
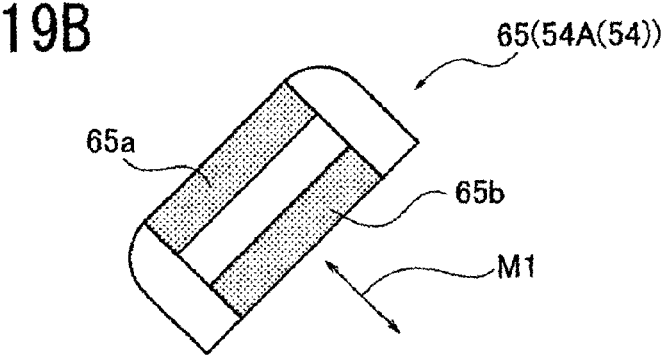
FIG. 19B shows the first coil according to the second embodiment.
Figure 19C:
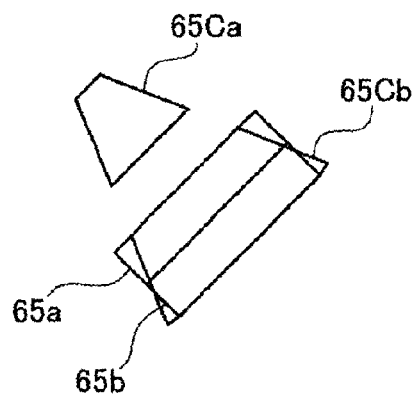
FIG. 19C shows the sizes of the first coils in FIGS. 19A and 19B for comparison.

A digital camera 10C as imaging device according to a third embodiment is described with reference to FIGS. 18, 19A to 19C. The digital camera 10C is different from those 10A, 10B in the first and second embodiments in a first coil 65C and a second coil 66C to flow electric currents to a drive mechanism 54C. FIG. 18 shows that the lens barrel 13 or blur correcting mechanism 50C is accommodated in the body 11B. FIG. 19A shows the first coil 65C seen from the Z axis, FIG. 19B shows the first coil 65 according to the second embodiment for comparison, and FIG. 19C shows the sizes of the first coil 65C and the first coil 65 for comparison.

In the digital camera 10C the first and second coils 65C, 66C are formed in a trapezoidal shape along Z axis, as shown in FIG. 18. The structures thereof are basically the same except for set positions and directions so that only the first coil 65C is described in the following.

The first coil 65C is trapezoidally shaped such that the width becomes narrower as it is separated from the optical axis OA. In comparison with the first coil 65 in the second embodiment, it can be placed at the very corner of the fixed frame 41, efficiently using the triangular corner space of the fixed frame 41 of a square shape. That is, the size of the first coil 65C along the first straight line can be larger than that of the first coil 65. In the third embodiment the width of the first coil 65 along the XY plane is set to be twice larger than that of the first coil 65 and it is formed of an increased number of wound wire spirals.

The first driver 54AC with the first coil 65C generates a larger drive force than the first driver 54A in the second embodiment, applied with the same amount of electric current. A magnetic field is formed toward the first coil 65C of the first driver 54AC along the Z axis in FIG. 19A and the first coil 65C flows electric current in the winding direction. At the top and bottom portions 65Ca, 65Cb of the trapezoid, the electric current flows in the second direction M2. Therefore, along with the current flow, the drive force acts on the top and bottom portions of the first coil 65C in the first direction M1. This holds true in the first driver 54A in the second embodiment. As shown in FIG. 19B, the drive force acts on two straight portions 65a, 65b of the first coil 65 in the first direction M1.

The larger the amount of current flows in the straight portions 65Ca, 65Cb, 65a, 65b, the larger the drive force. The amount of current flow increases in accordance with the number of wound wire spirals of the first coils 65C and 65 or the width thereof along the ZY plane. The size of the top portion 65Cb is approximately equal to the sum of the sizes of the straight portions 65a, 65b. Thus, the amount of the drive force almost equivalent to that acting on the entire first coil 65 can be applied to the straight portions 65Cb, 65Ca. Applied with the same amount of electric current, the first driver AC with the first coil 65C can generate a larger drive force than the first driver 54A in the second embodiment. So can a second driver 54BC or a second coil 66C.

The digital camera 10C as an imaging device can achieve the same effects as those of the digital camera 10 in the second embodiment.

In addition, in the digital camera 10C the drive force of the drive mechanism can be increased without an increase in the size of the blur correcting mechanism 50 and the fixed frame 41. Accordingly, it can accurately perform blur correction with reduced power consumption.

Thus, the digital camera 10C can smoothly and accurately perform image blur correction.

The above embodiments have described the digital cameras 10 by way of example. The present invention should not be limited to such an example. The present application is applicable to any imaging device as long as it comprises an optical system including one or more optical elements, an image sensor to obtain an image of a subject formed by the optical system, a lens barrel in which the optical elements are mounted, and being movable relative to a device body to move the optical elements along an optical axis, a fixed element at a fixed position in the device body in an orthogonal direction relative to the optical axis, a movable element on which the image sensor is mounted, and being movable relative to the fixed element along a plane vertical to the optical axis, a drive mechanism to generate a drive force by flowing an electric current into a magnetic field, to move the movable element relative to the fixed element, and two or more movable connectors each including a bar element provided in one of the fixed element and the movable element and a bearing provided in the other of the fixed element and the movable element to movably support the bar element along an axis of the bar element, in which the bar elements of the movable connectors are set to move in different directions from each other along the plane orthogonal to the optical axis, and at least one of the bearings is disposed outside the lens barrel in the orthogonal direction relative to the optical axis.

The above embodiments have described an example where the three bearings of the movable connector 55 are disposed outside the maximal diameter of the movable lens barrel 49 seen from the XY plane. The present invention should not be limited to such an example. It can be arbitrarily configured as long as at least one of the bearings is provided outside the maximal diameter of the movable lens barrel 49.

Further, the above embodiments have described an example where the movable lens barrel 49 is comprised of the first rotary cylinder 42, the second rotary cylinder 44, and the moving cylinder 47. The lens barrel can be arbitrarily configured as long as the lens barrel 13 containing the optical elements is movable relative to the body 11.

The above embodiments have described an example where the two first bar elements 61 are provided in the first guide plate 52 while the two first bearings 62 are provided in the second guide plate 53. Alternatively, either or both of the two first bar elements 61 can be provided in the second guide plate 53 and either or both of the two first bearings 62 can be provided in the first guide plate 52.

The above embodiments have described an example where the two second bar elements 63 are provided in the base 51 and the two second bearings 64 are provided in the second guide plate 53. Alternatively, either or both of the two second bar elements 63 can be provided in the second guide plate 53 and either or both of the two second bearings 64 can be provided in the base 51.

The above embodiments have described the digital cameras by way of example. The present invention is also applicable to an electronic device such as PDA (personal data assistant), hand-held data terminal device as mobile phone, image input device. Such an electronic device with a camera function has been in wide use.

Although the present invention has been described in terms of exemplary embodiments, it is not limited thereto. It should be appreciated that variations or modifications may be made in the embodiments described by persons skilled in the art without departing from the scope of the present invention as defined by the following claims.

The invention claimed is:

1. An imaging device comprising:
    an optical system including one or more optical elements;
    an image sensor to obtain an image of a subject formed by the optical system;
    a lens barrel in which the optical elements are mounted, and being movable relative to a device body to move the optical elements along an optical axis;
    a fixed element at a fixed position in the device body in an orthogonal direction relative to the optical axis;
    a movable element on which the image sensor is mounted, and being movable relative to the fixed element along a plane vertical to the optical axis;
    a drive mechanism to generate a drive force by flowing an electric current into a magnetic field, to move the movable element relative to the fixed element; and
    two or more movable connectors each including a bar element provided in one of the fixed element and the movable element and a bearing provided in the other of the fixed element and the movable element to movably support the bar element along an axis of the bar element, wherein
    the bar elements of the movable connectors are set to move in different directions from each other along the plane orthogonal to the optical axis;
    at least one of the bearings is disposed outside the maximal diameter of the lens barrel in the orthogonal direction relative to the optical axis; and
    the movable connectors are disposed so that a straight line connecting the bearings of two of the movable connectors comes near the gravity center of the movable element and is approximately parallel to a direction of a first drive force generated by the drive mechanism and applied to the two movable connectors.

2. An imaging device according to claim 1, wherein:
    one of the bar elements moves relative to the corresponding bearing in a first direction while the other of the bar elements moves relative to the corresponding bearing in a second direction;
    the movable connector moved in the first direction is a first movable connector comprised of a pair of connectors placing a gravity center of the movable element therebetween, and the movable connector moved in the second direction is a second movable connector; and
    the drive mechanism is configured to generate the first drive force and a second drive force to act on in different directions from each other along the plane orthogonal to the optical axis.

3. An imaging device according to claim 2, wherein:
    the first direction is inclined at 45 degrees vertically relative to the device body in a reference posture with the optical axis set in a horizontal direction; and
    the second direction is orthogonal to the first direction.

4. An imaging device according to claim 1, wherein:

the drive mechanism includes a first driver to generate the first drive force to act along the plane orthogonal to the optical axis, and a second driver to generate a second drive force to act in a direction orthogonal to the first drive force along the plane orthogonal to the optical axis;

the first driver is placed outside the lens barrel in the orthogonal direction to the optical axis on a first straight line inclined at 45 degrees vertically relative to the device body in a reference posture with the optical axis set in a horizontal direction; and the second driver is placed outside the lens barrel in the orthogonal direction to the optical axis on a second straight line orthogonal to the first straight line and inclined at 45 degrees vertically relative to the device body in the reference posture.

5. An imaging device according to claim 4, further comprising a box element with a rectangular cross section orthogonal to the optical axis, to surround the lens barrel around the optical axis and accommodate the fixed element, movable element, and drive mechanism, wherein the first driver and second driver are disposed in a corner of the box element.

6. An imaging device according to claim 4, wherein the first drive force and the second drive force act towards the gravity center of the movable element.

7. An imaging device according to claim 1, further comprising a position detector to detect a position of the movable element relative to the fixed element along the plane orthogonal to the optical axis, wherein:

the drive mechanism includes a first driver to generate the first drive force to act along the plane orthogonal to the optical axis, and a second driver to generate a second drive force to act in a direction orthogonal to the first drive force along the plane orthogonal to the optical axis; and the position detector includes a first detector element to detect the position of the movable element relative to the fixed element in a direction of the first drive force and a second detector element to detect the position of the movable element relative to the fixed element in a direction of the second drive force.

8. An imaging device according to claim 1, wherein:

the device body has a rectangular cross section orthogonal to the optical axis; and the drive mechanism is placed in a corner of the device body.

9. An imaging device according to claim 1, wherein the drive mechanism includes a magnet to generate a magnetic field along the optical axis, and a coil to flow an electric current orthogonally relative to the magnetic field and having a trapezoidal cross section orthogonal to the optical axis such that a width of the cross section is shortened as it is away from the optical axis.

10. An imaging device according to claim 1, further comprising a shake detector to detect a moving amount of the device body along the plane orthogonal to the optical axis, wherein the drive mechanism is configured to move the movable element relative to the fixed element in accordance with a detection signal from the shake detector, to move the image sensor along with a moving subject image.

11. An imaging device according to claim 10, wherein:

one of the bar elements moves relative to the corresponding bearing in a first direction while the other of the bar elements moves relative to the corresponding bearing in a second direction;

the movable connector moved in the first direction is a first movable connector and the movable connector moved in the second direction is a second movable connector; and the shake detector is configured to detect the moving amount of the device body in both of the first and second directions.

12. An electronic device comprising the imaging device according to claim 1.

* * * * *